(12) United States Patent
Choi et al.

(10) Patent No.: US 11,762,078 B2
(45) Date of Patent: Sep. 19, 2023

(54) LINE OF SIGHT DETERMINATION BASED ON DIRECTION AND DISTANCE THRESHOLDS

(71) Applicant: QUALCOMM Incorporated, San Diego, CA (US)

(72) Inventors: Chang-Sik Choi, Hillsborough, NJ (US); Kapil Gulati, Belle Mead, NJ (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 361 days.

(21) Appl. No.: 17/160,022

(22) Filed: Jan. 27, 2021

(65) Prior Publication Data

US 2022/0236396 A1 Jul. 28, 2022

(51) Int. Cl.
*G01S 13/42* (2006.01)
*G01S 5/02* (2010.01)

(52) U.S. Cl.
CPC ............ *G01S 13/42* (2013.01); *G01S 5/0218* (2020.05)

(58) Field of Classification Search
CPC ................................ G01S 13/42; G01S 5/0218
See application file for complete search history.

(56) References Cited

U.S. PATENT DOCUMENTS

| | | | |
|---|---|---|---|
| 2019/0373575 A1* | 12/2019 | Kurras | G01S 5/10 |
| 2021/0003685 A1 | 1/2021 | Hong et al. | |
| 2022/0039048 A1* | 2/2022 | Khoryaev | G01S 5/0273 |
| 2022/0140926 A1* | 5/2022 | Gulati | H04L 1/0003 |
| | | | 370/252 |
| 2022/0229143 A1* | 7/2022 | Dwivedi | G01S 5/0218 |

FOREIGN PATENT DOCUMENTS

| | | |
|---|---|---|
| WO | 2018068817 A1 | 4/2018 |
| WO | 2020006492 | 1/2020 |
| WO | 2020069083 A1 | 4/2020 |

OTHER PUBLICATIONS

International Search Report and Written Opinion—PCT/US2021/061236—ISA/EPO—dated Mar. 16, 2022.

* cited by examiner

*Primary Examiner* — Donald HB Braswell
(74) *Attorney, Agent, or Firm* — Thien T. Nguyen

(57) ABSTRACT

A UE includes: a wireless transceiver; a directional, reflection-based ranging system configured to determine directions and distances between the UE and reflectors; and a processor configured to: obtain, from the ranging system (1) a first direction, between the UE and a particular reflector, and (2) a first distance, between the UE and the particular reflector, corresponding to the first direction; determine, based on a positioning reference signal (PRS) received by the wireless transceiver from a PRS source (3) a second direction, corresponding to an angle of arrival of the PRS at the UE, and (4) a second distance, traveled by the PRS from the PRS source to the UE, corresponding to the second direction; and determine whether the second distance is a line-of-sight distance between the UE and the PRS source based on the first direction, the first distance, the second direction, and the second distance.

17 Claims, 8 Drawing Sheets

LINE OF SIGHT DETERMINATION BASED ON DIRECTION AND DISTANCE THRESHOLDS

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), a fifth-generation (5G) service, etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Orthogonal Frequency Division Multiple Access (OFDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

In an embodiment, a UE (user equipment) includes: a memory; a wireless transceiver; a directional, reflection-based ranging system configured to determine directions between the UE and reflectors and corresponding distances between the UE and the reflectors; and a processor, communicatively coupled to the memory, the wireless transceiver, and the directional, reflection-based ranging system and configured to: obtain, from the ranging system (1) a first direction, between the UE and a particular reflector, and (2) a first distance, between the UE and the particular reflector, corresponding to the first direction; determine, based on a positioning reference signal (PRS) received by the wireless transceiver from a PRS source (3) a second direction, corresponding to an angle of arrival of the PRS at the UE, and (4) a second distance, traveled by the PRS from the PRS source to the UE, corresponding to the second direction; and determine whether the second distance is a line-of-sight distance between the UE and the PRS source based on the first direction, the first distance, the second direction, and the second distance.

Implementations of such a UE may include one or more of the following features. The processor is configured to determine that the second distance is the line-of-sight distance between the UE and the PRS source based on the first direction and the second direction being within a first threshold closeness and based on the first distance and the second distance being within a second threshold closeness. The processor is configured to determine the first threshold based on an angular accuracy of the second direction. The processor is configured to determine the first threshold based on a quantity of antenna elements of the wireless transceiver used to receive one or more PRS.

Also or alternatively, implementations of such a UE may include one or more of the following features. The processor is configured to determine that the second distance is a non-line-of-sight distance between the UE and the PRS source based on the first direction and the second direction being within a first threshold closeness and based on the first distance and the second distance being outside of a second threshold closeness. The processor is configured to send a report, via the wireless interface, including position information determined from the one or more PRS and at least one line-of-sight/non-line-of-sight indication indicating whether the position information is based on a line-of-sight measurement or a non-line-of-sight measurement. The position information includes a location estimate of the UE. The processor is configured to: obtain, from the ranging system (5) a plurality of first directions between the UE and a corresponding plurality of reflectors, and (6) a plurality of first distances corresponding to the plurality of first directions; and determine whether the second distance is the line-of-sight distance between the UE and the PRS source without using any of the plurality of first direction indications based on the second direction being outside a threshold closeness with respect to each of the plurality of first directions.

In an embodiment, a UE includes: means for transmitting a ranging signal and receiving a reflection of the ranging signal; means for determining, based on the ranging signal and the reflection of the ranging signal, (1) a first direction, between the UE and a reflector, and (2) a first distance, between the UE and the reflector, corresponding to the first direction; means for determining, based on a positioning reference signal (PRS) received by the UE from a PRS source, (3) a second direction, corresponding to an angle of arrival of the PRS at the UE, and (4) a second distance, traveled by the PRS from the PRS source to the UE, corresponding to the second direction; and means for determining whether the second distance is a line-of-sight distance between the UE and the PRS source based on the first direction, the first distance, the second direction, and the second distance.

Implementations of such a UE may include one or more of the following features. The means for determining whether the second distance is the line-of-sight distance between the UE and the PRS source include means for determining that the second distance is the line-of-sight distance between the UE and the PRS source based on the first direction and the second direction being within a first threshold closeness and based on the first distance and the second distance being within a second threshold closeness. The UE includes means for determining the first threshold based on an angular accuracy of the second direction. The means for determining the first threshold include means for determining the first threshold based on a quantity of antenna elements of the means for determining the second direction between the UE and the PRS source.

Also or alternatively, implementations of such a UE may include one or more of the following features. The means for determining whether the second distance is the line-of-sight distance between the UE and the PRS source include means for determining that the second distance is a non-line-of-sight distance between the UE and the PRS source based on the first direction and the second direction being within a first threshold closeness and based on the first distance and the second distance being outside of a second threshold closeness. The UE includes means for sending a report including position information determined from the one or more PRS and at least one line-of-sight/non-line-of-sight indication indicating whether the position information is based on a line-of-sight measurement or a non-line-of-sight measurement. The position information includes a location estimate of the UE.

In an embodiment, a method of determining a line-of-sight relationship between a UE and a PRS source includes: transmitting a ranging signal; receiving a reflection of the ranging signal; determining, based on the ranging signal and the reflection of the ranging signal, (1) a first direction, between the UE and a reflector, and (2) a first distance, between the UE and the reflector, corresponding to the first direction; determining, based on a PRS received by the UE from the PRS source, (3) a second direction, corresponding to an angle of arrival of the PRS at the UE, and (4) a second distance, traveled by the PRS from the PRS source to the UE, corresponding to the second direction; and determining whether the second distance is a line-of-sight distance between the UE and the PRS source based on the first direction, the first distance, the second direction, and the second distance.

Implementations of such a method may include one or more of the following features. Determining whether the second distance is the line-of-sight distance between the UE and the PRS source includes determining that the second distance is the line-of-sight distance between the UE and the PRS source based on the first direction and the second direction being within a first threshold closeness and based on the first distance and the second distance being within a second threshold closeness. The method includes determining the first threshold based on an angular accuracy of the second direction. Determining the first threshold includes determining the first threshold based on a quantity of antenna elements used to determine the second direction between the UE and the PRS source.

Also or alternatively, implementations of such a method may include one or more of the following features. Determining whether the second distance is the line-of-sight distance between the UE and the PRS source includes determining that the second distance is a non-line-of-sight distance between the UE and the PRS source based on the first direction and the second direction being within a first threshold closeness and based on the first distance and the second distance being outside of a second threshold closeness. The method includes sending a report including position information determined from the one or more PRS and at least one line-of-sight/non-line-of-sight indication indicating whether the position information is based on a line-of-sight measurement or a non-line-of-sight measurement. The position information includes a location estimate of the UE.

In an embodiment, a non-transitory, processor-readable storage medium includes processor-readable instructions to cause a processor of a UE, in order to determine a line-of-sight relationship between the UE and a PRS source, to: transmit a ranging signal; determine, based on the ranging signal and a reflection of the ranging signal received by the UE, (1) a first direction, between the UE and a reflector, and (2) a first distance, between the UE and the reflector, corresponding to the first direction; determine, based a PRS received by the UE from the PRS source, (3) a second direction, corresponding to an angle of arrival of the PRS at the UE, and (4) a second distance, traveled by the PRS from the PRS source to the UE, corresponding to the second direction; and determine whether the second distance is a line-of-sight distance between the UE and the PRS source based on the first direction, the first distance, the second direction, and the second distance.

Also or alternatively, implementations of such a storage medium may include one or more of the following features. The instructions to cause the processor to determine whether the second distance is the line-of-sight distance between the UE and the PRS source include instructions to cause the processor to determine that the second distance is the line-of-sight distance between the UE and the PRS source based on the first direction and the second direction being within a first threshold closeness and based on the first distance and the second distance being within a second threshold closeness. The instructions include instructions to cause the processor to determine the first threshold based on an angular accuracy of the second direction. The instructions to cause the processor to determine the first threshold include instructions to cause the processor to determine the first threshold based on a quantity of antenna elements used to determine the second direction between the UE and the PRS source.

Also or alternatively, implementations of such a storage medium may include one or more of the following features. The instructions to cause the processor to determine whether the second distance is the line-of-sight distance between the UE and the PRS source include instructions to cause the processor to determine that the second distance is a non-line-of-sight distance between the UE and the PRS source based on the first direction and the second direction being within a first threshold closeness and based on the first distance and the second distance being outside of a second threshold closeness. The instructions include instructions to cause the processor to send a report including position information determined from the one or more PRS and at least one line-of-sight/non-line-of-sight indication indicating whether the position information is based on a line-of-sight measurement or a non-line-of-sight measurement. The position information includes a location estimate of the UE.

DETAILED DESCRIPTION

Figure 1:
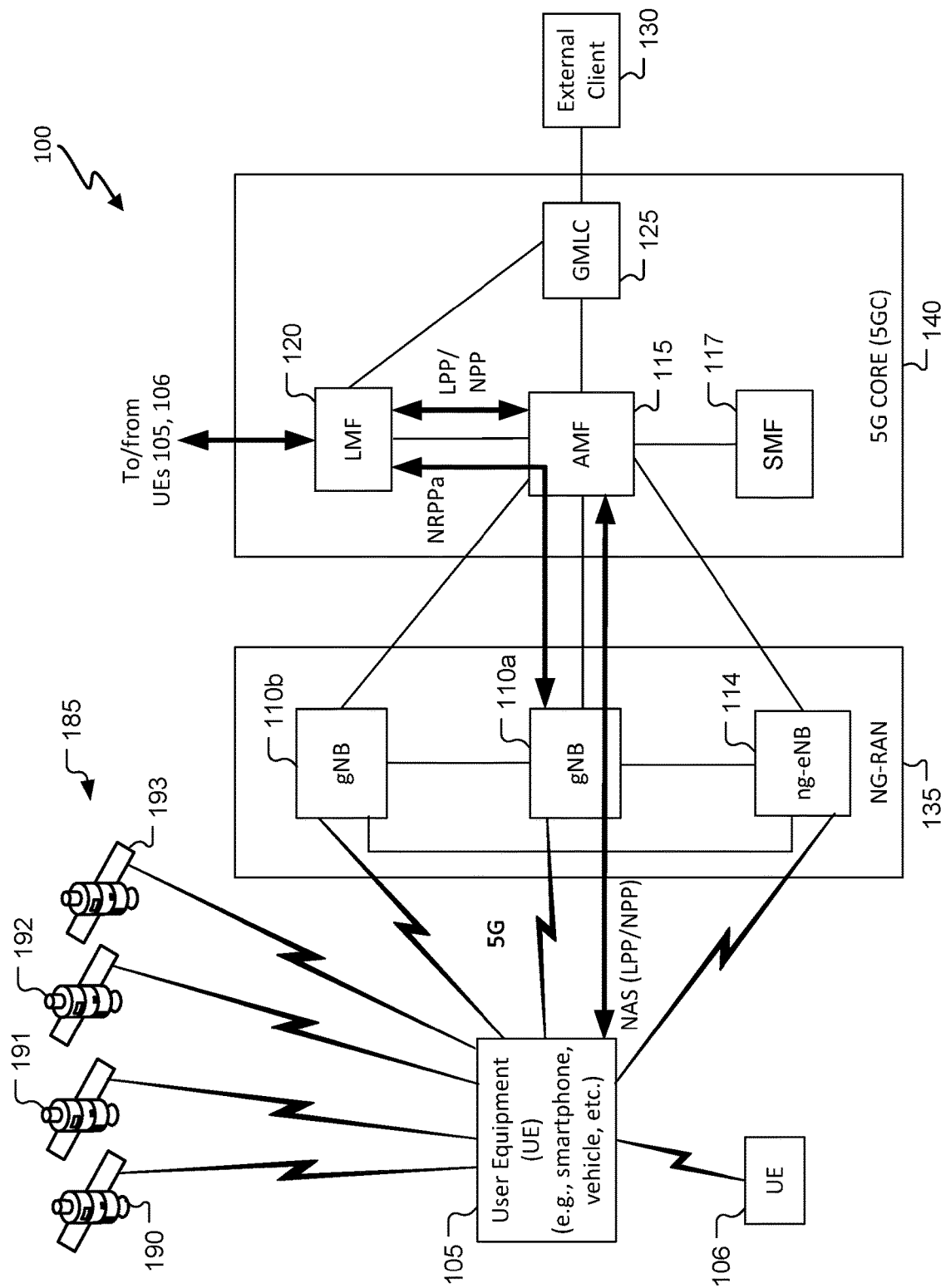
FIG. 1 is a simplified diagram of an example wireless communications system.

Techniques are discussed herein for determining whether signals received from a signal source were line-of-sight transmissions, i.e., followed a line-of-sight path from source to receiver. For example, a reflection-based ranging system of a user equipment may determine angles and distances from the user equipment to a reflector. The user equipment may also determine angles of arrival of positioning reference signals (PRS) from respective sources and determine distances traveled by the positioning reference signals. By comparing the angles of arrival to the ranging-system-determined angles and the respective distances, whether the positioning reference signals traveled line-of-sight (LOS) paths can be determined. For example, if an angle of arrival corresponds (is close) to a ranging-system-determined angle, and the corresponding distance traveled by the PRS corresponds (is close) to the respective ranging-system-determined distance, then the PRS can be identified as having traveled an LOS path. If the angles correspond but the distances do not, then the PRS can be identified has having traveled a non-line-of-sight (NLOS) path. If the angle of arrival does not correspond to a ranging-system-determined angle, then LOS/NLOS status of the PRS path can be identified as uncertain, in which case one or more other techniques in addition to or instead of the above techniques may be used to determine the LOS/NLOS status of the PRS path. These are examples, and other examples may be implemented.

Items and/or techniques described herein may provide one or more of the following capabilities, as well as other capabilities not mentioned. Accuracy of determined position information may be improved. Radio frequency fingerprinting can be improved, e.g., by providing LOS/NLOS and transmit/receive location pair information (indicating transmit/receive information and an LOS/NLOS flag (of whether there is LOS or NLOS at that(those) location(s))) and/or providing information regarding angles and distances to reflecting objects. Other capabilities may be provided and not every implementation according to the disclosure must provide any, let alone all, of the capabilities discussed.

Obtaining the locations of mobile devices that are accessing a wireless network may be useful for many applications including, for example, emergency calls, personal navigation, consumer asset tracking, locating a friend or family member, etc. Existing positioning methods include methods based on measuring radio signals transmitted from a variety of devices or entities including satellite vehicles (SVs) and terrestrial radio sources in a wireless network such as base stations and access points. It is expected that standardization for the 5G wireless networks will include support for various positioning methods, which may utilize reference signals transmitted by base stations in a manner similar to which LTE wireless networks currently utilize Positioning Reference Signals (PRS) and/or Cell-specific Reference Signals (CRS) for position determination.

The description may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various aspects described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, such UEs may be any wireless communication device (e.g., a mobile phone, router, tablet computer, laptop computer, consumer asset tracking device, Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE 802.11, etc.) and so on.

A base station may operate according to one of several RATs in communication with UEs depending on the network in which it is deployed, and may be alternatively referred to as an Access Point (AP), a Network Node, a NodeB, an evolved NodeB (eNB), a general Node B (gNodeB, gNB), etc. In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Referring to FIG. 1, an example of a communication system 100 includes a UE 105, a UE 106, a Radio Access Network (RAN) 135, here a Fifth Generation (5G) Next Generation (NG) RAN (NG-RAN), and a 5G Core Network (5GC) 140. The UE 105 and/or the UE 106 may be, e.g., an IoT device, a location tracker device, a cellular telephone, a vehicle (e.g., a car, a truck, a bus, a boat, etc.), or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110a, 110b, and the ng-eNB 114 may be referred to as base stations (BSs). The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. The BSs 110a, 110b, 114 may be a macro cell (e.g., a high-power cellular base station), or a small cell (e.g., a low-power cellular base station), or an access point (e.g., a short-range base station configured to communicate with short-range technology such as WiFi, WiFi-Direct (WiFi-D), Bluetooth®, Bluetooth®-low energy (BLE), Zigbee, etc. One or more of the BSs 110a, 110b, 114 may be configured to communicate with the UE 105 via multiple carriers. Each of the BSs 110a, 110b, 114 may provide communication coverage for a respective geographic region, e.g. a cell. Each cell may be partitioned into multiple sectors as a function of the base station antennas. Other base stations may be included in the communication system 100 such as one or more WLAN APs (wireless local area network access points).

FIG. 1 provides a generalized illustration of various components, any or all of which may be utilized as appropriate, and each of which may be duplicated or omitted as necessary. Specifically, although only one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110a, 110b are examples and may, in various embodiments, be replaced by or include various other location server functionality and/or base station functionality respectively.

The system 100 is capable of wireless communication in that components of the system 100 can communicate with one another (at least some times using wireless connections) directly or indirectly, e.g., via the BSs 110a, 110b, 114 and/or the network 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples only as the UE 105 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 100 and may communicate with each other and/or with the UE 105, the BSs 110a, 110b, 114, the core network 140, and/or the external client 130. For example, such other devices may include internet of thing (IoT)

devices, medical devices, home entertainment and/or automation devices, etc. The core network 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long-Term Evolution), V2X (Vehicle-to-Everything, e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH).

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110a, 110b, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110a and 110b. Pairs of the gNBs 110a, 110b in the NG-RAN 135 may be connected to one another via one or more other gNBs. Access to the 5G network is provided to the UE 105 via wireless communication between the UE 105 and one or more of the gNBs 110a, 110b, which may provide wireless communications access to the 5GC 140 on behalf of the UE 105 using 5G. In FIG. 1, the serving gNB for the UE 105 is assumed to be the gNB 110a, although another gNB (e.g. the gNB 110b) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110a, 110b in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110a, 110b and/or the ng-eNB 114 may be configured to function as positioning-only beacons which may transmit signals to assist with determining the position of the UE 105 but may not receive signals from the UE 105 or from other UEs.

The BSs 110a, 110b, 114 may each comprise one or more TRPs. For example, each sector within a cell of a BS may comprise a TRP, although multiple TRPs may share one or more components (e.g., share a processor but have separate antennas). The system 100 may include only macro TRPs or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110a, 110b and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications, or directly with the BSs 110a, 110b, 114. The LMF 120 may support positioning of the UE 105 when the UE 105 accesses the NG-RAN 135 and may support position procedures/methods such as Assisted GNSS (A-GNSS), Observed Time Difference of Arrival (OTDOA) (e.g., Downlink (DL) OTDOA or Uplink (UL) OTDOA), Round Trip Time (RTT), Multi-Cell RTT, Real Time Kinematics (RTK), Precise Point Positioning (PPP), Differential GNSS (DGNSS), Enhanced Cell ID (E-CID), angle of arrival (AoA), angle of departure (AoD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110a, 110b and/or the ng-eNB 114, and/or assistance data provided to the UE 105, e.g. by the LMF 120). The AMF 115 may serve as a control node that processes signaling between the UE 105 and the core network 140, and may provide QoS (Quality of Service) flow and session management. The AMF 115 may support mobility of the UE 105 including cell change and handover and may participate in supporting signaling connection to the UE 105.

The GMLC 125 may support a location request for the UE 105 received from the external client 130 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130. The GMLC 125 is shown connected to both the AMF 115 and LMF 120, though only one of these connections may be supported by the 5GC 140 in some implementations.

As further illustrated in FIG. 1, the LMF 120 may communicate with the gNBs 110a, 110b and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110a (or the gNB 110b) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110a, 110b or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110a, 110b or the ng-eNB 114) and/or may be used by the LMF 120 to obtain location related information from the gNBs 110a, 110b and/or the ng-eNB 114, such as parameters defining directional SS transmissions from the gNBs 110a, 110b, and/or the ng-eNB 114. The LMF 120 may be co-located or integrated with a gNB or a TRP, or may be disposed remote from the gNB and/or the TRP and configured to communicate directly or indirectly with the gNB and/or the TRP.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110a, 110b, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110a, 110b, the ng-eNB 114, or other base stations or APs).

With a network-based position method, one or more base stations (e.g., the gNBs 110a, 110b, and/or the ng-eNB 114) or APs may obtain location measurements (e.g., measurements of RSSI, RTT, RSRP, RSRQ or Time Of Arrival (ToA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110a, 110b, and/or the ng-eNB 114 to the LMF 120 using NRPPa may include timing and configuration information for directional SS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110a, 110b, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110a (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 150. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110a, 110b, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS beams, sent by base stations (such as the gNBs 110a, 110b, and/or the ng-eNB 114) that are within range of the UE whose position is to be determined (e.g., the UE 105 of FIG. 1). The UE may, in some instances, use the directional SS beams from a plurality of base stations (such as the gNBs 110a, 110b, the ng-eNB 114, etc.) to compute the UE's position.

Figure 2:
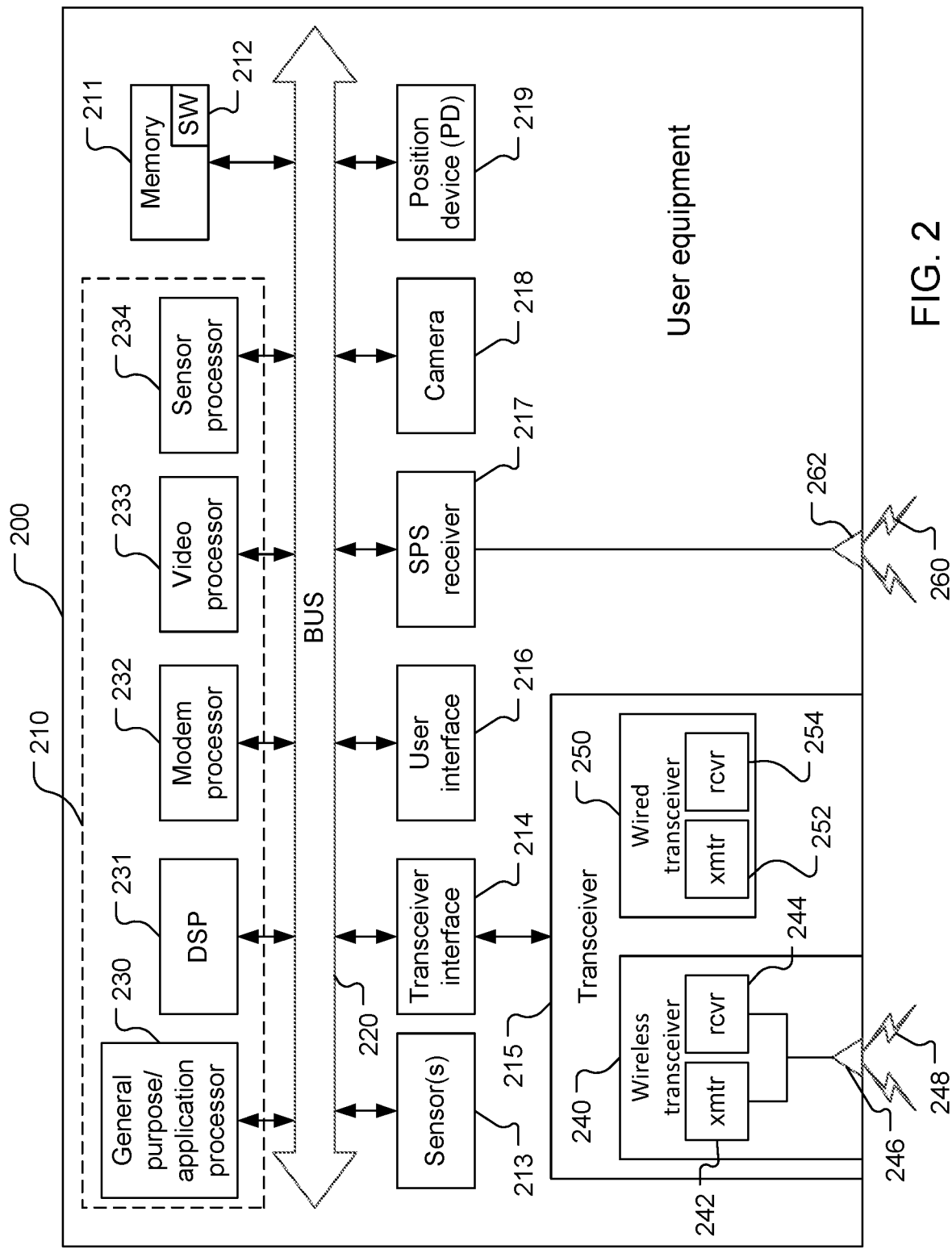
FIG. 2 is a block diagram of components of an example user equipment shown in FIG. 1.

Referring also to FIG. 2, a UE 200 is an example of one of the UEs 105, 106 and comprises a computing platform including a processor 210, memory 211 including software (SW) 212, one or more sensors 213, a transceiver interface 214 for a transceiver 215 (that includes a wireless transceiver 240 and a wired transceiver 250), a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for radar, ultrasound, and/or lidar, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer only to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, the wireless transceiver 240, and one or more of the sensor(s) 213, the user interface 216, the SPS receiver 217, the camera 218, the PD 219, and/or the wired transceiver 250.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the processor 230 and/or the DSP 231. Other configurations, however, may be used to perform baseband processing.

The UE 200 may include the sensor(s) 213 that may include, for example, one or more of various types of sensors such as one or more inertial sensors, one or more magnetometers, one or more environment sensors, one or more optical sensors, one or more weight sensors, and/or one or more radio frequency (RF) sensors, etc. The sensor(s) 213 may include a radar system, a lidar system, and/or a sonar system, including one or more antennas as appropriate. An inertial measurement unit (IMU) may comprise, for example, one or more accelerometers (e.g., collectively responding to acceleration of the UE 200 in three dimensions) and/or one or more gyroscopes (e.g., three-dimensional gyroscope(s)). The sensor(s) 213 may include one or more magnetometers (e.g., three-dimensional magnetometer (s)) to determine orientation (e.g., relative to magnetic north and/or true north) that may be used for any of a variety of purposes, e.g., to support one or more compass applications. The environment sensor(s) may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU may be configured to provide measurements about a direction of motion and/or a speed of motion of the UE 200, which may be used in relative location determination. For example, one or more accelerometers and/or one or more gyroscopes of the IMU may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) and gyroscope(s) taken after this moment in time may be used in dead reckoning to determine present location of the UE 200 based on movement (direction and distance) of the UE 200 relative to the reference location.

The magnetometer(s) may determine magnetic field strengths in different directions which may be used to determine orientation of the UE 200. For example, the orientation may be used to provide a digital compass for the UE 200. The magnetometer(s) may include a two-dimensional magnetometer configured to detect and provide indications of magnetic field strength in two orthogonal dimensions. Alternatively, the magnetometer(s) may include a three-dimensional magnetometer configured to detect and provide indications of magnetic field strength in three orthogonal dimensions. The magnetometer(s) may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to one or more antennas 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. Thus, the wireless transmitter 242 may include multiple transmitters that may be discrete components or combined/integrated components, and/or the wireless receiver 244 may include multiple receivers that may be discrete components or combined/integrated components. While a single antenna 246 is shown in FIG. 2, the antenna 246 may include more than one antenna, e.g., for diversity and/or to provide a phased array of antennas (although a single antenna may be a phased-array antenna). The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wired transceiver 250 may include a wired transmitter 252 and a wired receiver 254 configured for wired communication, e.g., with the network 135. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The antenna 262 is configured to transduce the wireless signals 260 to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer only to the PD 219 being configured to perform, or performing, in accordance with the positioning method(s). The PD 219 may also or alternatively be configured to determine location of the UE 200 using terrestrial-based signals (e.g., at least some of the signals 248) for trilateration, for assistance with obtaining and using the SPS signals 260, or both. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion. Functionality of the PD 219 may be provided in a variety of manners and/or configurations, e.g., by the general purpose/application processor 230, the transceiver 215, the SPS receiver 262, and/or another component of the UE 200, and may be provided by hardware, software, firmware, or various combinations thereof.

Figure 3:
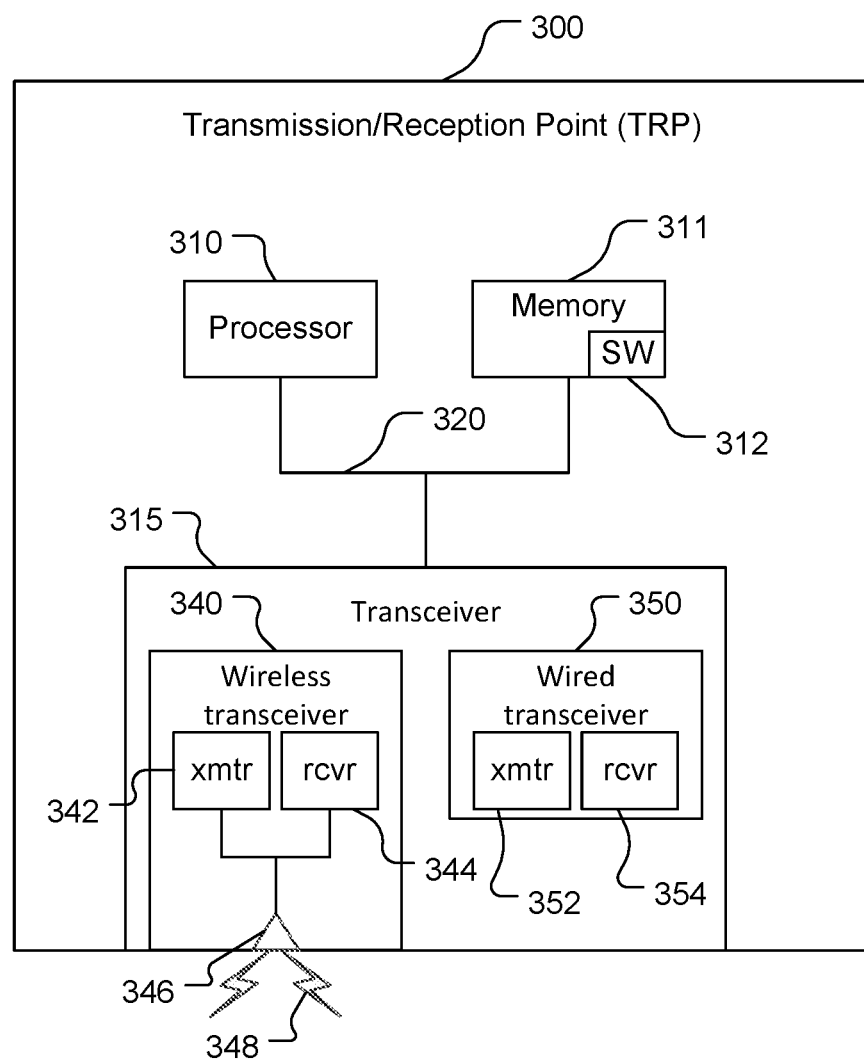
FIG. 3 is a block diagram of components of an example transmission/reception point shown in FIG. 1.

Referring also to FIG. 3, an example of a TRP 300 of the BSs 110a, 110b, 114 comprises a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless interface) may be omitted from the TRP 300. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions.

The description may refer only to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components (e.g., the processor 310 and the memory 311) of the TRP 300 (and thus of one of the BSs 110a, 110b, 114) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a wireless transmitter 342 and a wireless receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the wireless transmitter 342 may include multiple transmitters that may be discrete components or combined/integrated components, and/or the wireless receiver 344 may include multiple receivers that may be discrete components or combined/ integrated components. While a single antenna 346 is shown in FIG. 3, the antenna 346 may include more than one antenna, e.g., for diversity and/or to provide a phased array of antennas (although a single antenna may be a phased-array antenna). The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a wired transmitter 352 and a wired receiver 354 configured for wired communication, e.g., a network interface that may be utilized to communicate with the network 135 to send communications to, and receive communications from, the LMF 120, for example, and/or one or more other network entities. The wired transmitter 352 may include multiple transmitters that may be discrete components or combined/integrated components, and/or the wired receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Figure 4:
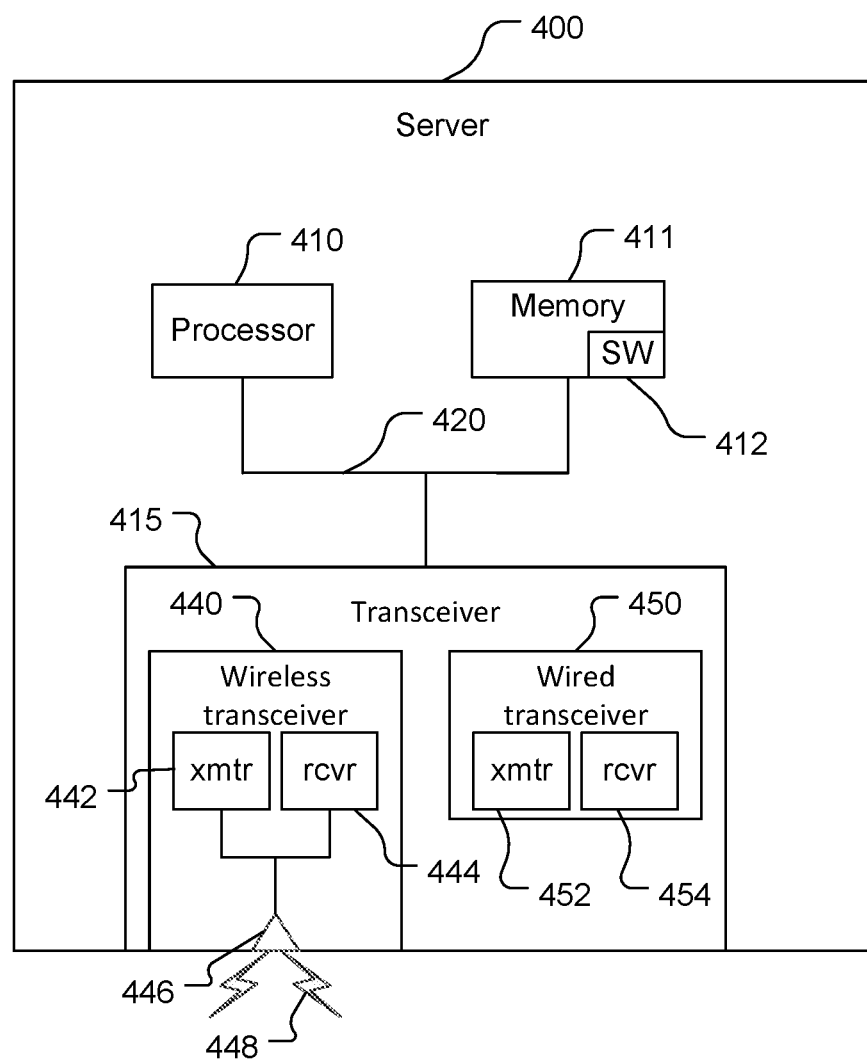
FIG. 4 is a block diagram of components of an example server shown in FIG. 1.

Referring also to FIG. 4, a server 400, which is an example of the LMF 120, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless interface) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer only to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a wireless transmitter 442 and a wireless receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the wireless transmitter 442 may include multiple transmitters that may be discrete components or combined/integrated components, and/or the wireless receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a wired transmitter 452 and a wired receiver 454 configured for wired communication, e.g., a network interface that may be utilized to communicate with the network 135 to send communications to, and receive communications from, the TRP 300, for example, and/or one or more other entities. The wired transmitter 452 may include multiple transmitters that may be discrete components or combined/integrated components, and/or the wired receiver 454 may include multiple receivers that may be discrete components or combined/integrated components. The wired transceiver 450 may be configured, e.g., for optical communication and/or electrical communication.

The description herein may refer only to the processor 410 performing a function, but this includes other implementations such as where the processor 410 executes software (stored in the memory 411) and/or firmware. The description herein may refer to the server 400 performing a function as shorthand for one or more appropriate components (e.g., the processor 410 and the memory 411) of the server 400 performing the function.

Positioning Techniques

For terrestrial positioning of a UE in cellular networks, techniques such as Advanced Forward Link Trilateration (AFLT) and Observed Time Difference Of Arrival (OTDOA) often operate in "UE-assisted" mode in which measurements of reference signals (e.g., PRS, CRS, etc.) transmitted by base stations are taken by the UE and then provided to a location server. The location server then calculates the position of the UE based on the measurements and known locations of the base stations. Because these techniques use the location server to calculate the position of the UE, rather than the UE itself, these positioning techniques are not frequently used in applications such as car or cell-phone navigation, which instead typically rely on satellite-based positioning.

A UE may use a Satellite Positioning System (SPS) (a Global Navigation Satellite System (GNSS)) for high-accuracy positioning using precise point positioning (PPP) or real time kinematic (RTK) technology. These technologies use assistance data such as measurements from ground-based stations. LTE Release 15 allows the data to be encrypted so that only the UEs subscribed to the service can read the information. Such assistance data varies with time. Thus, a UE subscribed to the service may not easily "break encryption" for other UEs by passing on the data to other UEs that have not paid for the subscription. The passing on would need to be repeated every time the assistance data changes.

In UE-assisted positioning, the UE sends measurements (e.g., TDOA, Angle of Arrival (AoA), etc.) to the positioning server (e.g., LMF/eSMLC). The positioning server has the base station almanac (BSA) that contains multiple 'entries' or 'records', one record per cell, where each record contains geographical cell location but also may include other data. An identifier of the 'record' among the multiple 'records' in the BSA may be referenced. The BSA and the measurements from the UE may be used to compute the position of the UE.

In conventional UE-based positioning, a UE computes its own position, thus avoiding sending measurements to the network (e.g., location server), which in turn improves latency and scalability. The UE uses relevant BSA record information (e.g., locations of gNBs (more broadly base stations)) from the network. The BSA information may be encrypted. But since the BSA information varies much less often than, for example, the PPP or RTK assistance data described earlier, it may be easier to make the BSA information (compared to the PPP or RTK information) available to UEs that did not subscribe and pay for decryption keys. Transmissions of reference signals by the gNBs make BSA information potentially accessible to crowd-sourcing or wardriving, essentially enabling BSA information to be generated based on in-the-field and/or over-the-top observations.

Positioning techniques may be characterized and/or assessed based on one or more criteria such as position determination accuracy and/or latency. Latency is a time elapsed between an event that triggers determination of position-related data and the availability of that data at a positioning system interface, e.g., an interface of the LMF 120. At initialization of a positioning system, the latency for the availability of position-related data is called time to first fix (TTFF), and is larger than latencies after the TTFF. An inverse of a time elapsed between two consecutive position-related data availabilities is called an update rate, i.e., the rate at which position-related data are generated after the first fix. Latency may depend on processing capability, e.g., of the UE. For example, a UE may report a processing capability of the UE as a duration of DL PRS symbols in units of time (e.g., milliseconds) that the UE can process every T amount of time (e.g., T ms) assuming 272 PRB (Physical Resource Block) allocation. Other examples of capabilities that may affect latency are a number of TRPs from which the UE can process PRS, a number of PRS that the UE can process, and a bandwidth of the UE.

One or more of many different positioning techniques (also called positioning methods) may be used to determine position of an entity such as one of the UEs 105, 106. For example, known position-determination techniques include RTT, multi-RTT, OTDOA (also called TDOA and including UL-TDOA and DL-TDOA), Enhanced Cell Identification (E-CID), DL-AoD, UL-AoA, etc. RTT uses a time for a signal to travel from one entity to another and back to determine a range between the two entities. The range, plus a known location of a first one of the entities and an angle between the two entities (e.g., an azimuth angle) can be used to determine a location of the second of the entities. In multi-RTT (also called multi-cell RTT), multiple ranges from one entity (e.g., a UE) to other entities (e.g., TRPs) and known locations of the other entities may be used to determine the location of the one entity. In TDOA techniques, the difference in travel times between one entity and other entities may be used to determine relative ranges from the other entities and those, combined with known locations of the other entities may be used to determine the location of the one entity. Angles of arrival and/or departure may be used to help determine location of an entity. For example, an angle of arrival or an angle of departure of a signal combined with a range between devices (determined using signal, e.g., a travel time of the signal, a received power of the signal, etc.) and a known location of one of the devices may be used to determine a location of the other device. The angle of arrival or departure may be an azimuth angle relative to a reference direction such as true north. The angle of arrival or departure may be a zenith angle relative to directly upward from an entity (i.e., relative to radially outward from a center of Earth). E-CID uses the identity of a serving cell, the timing advance (i.e., the difference between receive and transmit times at the UE), estimated timing and power of detected neighbor cell signals, and possibly angle of arrival (e.g., of a signal at the UE from the base station or vice versa) to determine location of the UE. In TDOA, the difference in arrival times at a receiving device of signals from different sources along with known locations of the sources and known offset of transmission times from the sources are used to determine the location of the receiving device.

In a network-centric RTT estimation, the serving base station instructs the UE to scan for/receive RTT measurement signals (e.g., PRS) on serving cells of two or more neighboring base stations (and typically the serving base station, as at least three base stations are needed). The one of more base stations transmit RTT measurement signals on low reuse resources (e.g., resources used by the base station to transmit system information) allocated by the network (e.g., a location server such as the LMF 120). The UE records the arrival time (also referred to as a receive time, a reception time, a time of reception, or a time of arrival (ToA)) of each RTT measurement signal relative to the UE's current downlink timing (e.g., as derived by the UE from a DL signal received from its serving base station), and transmits a common or individual RTT response message (e.g., SRS (sounding reference signal) for positioning, i.e., UL-PRS) to the one or more base stations (e.g., when instructed by its serving base station) and may include the time difference $T_{Rx \to Tx}$ (i.e., UE $T_{Rx-Tx}$ or $UE_{Rx-Tx}$) between the ToA of the RTT measurement signal and the transmission time of the RTT response message in a payload of each RTT response message. The RTT response message would include a reference signal from which the base station can deduce the ToA of the RTT response. By comparing the difference $T_{Tx \to Rx}$ between the transmission time of the RTT measurement signal from the base station and the ToA of the RTT response at the base station to the UE-reported time difference $T_{Rx \to Tx}$, the base station can deduce the propagation time between the base station and the UE, from which the base station can determine the distance between the UE and the base station by assuming the speed of light during this propagation time.

A UE-centric RTT estimation is similar to the network-based method, except that the UE transmits uplink RTT measurement signal(s) (e.g., when instructed by a serving base station), which are received by multiple base stations in the neighborhood of the UE. Each involved base station responds with a downlink RTT response message, which may include the time difference between the ToA of the RTT measurement signal at the base station and the transmission time of the RTT response message from the base station in the RTT response message payload.

For both network-centric and UE-centric procedures, the side (network or UE) that performs the RTT calculation typically (though not always) transmits the first message(s) or signal(s) (e.g., RTT measurement signal(s)), while the other side responds with one or more RTT response message(s) or signal(s) that may include the difference between the ToA of the first message(s) or signal(s) and the transmission time of the RTT response message(s) or signal(s).

A multi-RTT technique may be used to determine position. For example, a first entity (e.g., a UE) may send out one or more signals (e.g., unicast, multicast, or broadcast from the base station) and multiple second entities (e.g., other TSPs such as base station(s) and/or UE(s)) may receive a signal from the first entity and respond to this received signal. The first entity receives the responses from the multiple second entities. The first entity (or another entity such as an LMF) may use the responses from the second entities to determine ranges to the second entities and may use the multiple ranges and known locations of the second entities to determine the location of the first entity by trilateration.

In some instances, additional information may be obtained in the form of an angle of arrival (AoA) or angle of departure (AoD) that defines a straight line direction (e.g., which may be in a horizontal plane or in three dimensions) or possibly a range of directions (e.g., for the UE from the locations of base stations). The intersection of two directions can provide another estimate of the location for the UE.

For positioning techniques using PRS (Positioning Reference Signal) signals (e.g., TDOA and RTT), PRS signals sent by multiple TRPs are measured and the arrival times of the signals, known transmission times, and known locations of the TRPs used to determine ranges from a UE to the TRPs. For example, an RSTD (Reference Signal Time Difference) may be determined for PRS signals received from multiple TRPs and used in a TDOA technique to determine position (location) of the UE. A positioning reference signal may be referred to as a PRS or a PRS signal. The PRS signals are typically sent using the same power and PRS signals with the same signal characteristics (e.g., same frequency shift) may interfere with each other such that a PRS signal from a more distant TRP may be overwhelmed by a PRS signal from a closer TRP such that the signal from the more distant TRP may not be detected. PRS muting may be used to help reduce interference by muting some PRS signals (reducing the power of the PRS signal, e.g., to zero and thus not transmitting the PRS signal). In this way, a weaker (at the UE) PRS signal may be more easily detected by the UE without a stronger PRS signal interfering with the weaker PRS signal. The term RS, and variations thereof (e.g., PRS, SRS), may refer to one reference signal or more than one reference signal.

Positioning reference signals (PRS) include downlink PRS (DL PRS) and uplink PRS (UL PRS) (which may be called SRS (Sounding Reference Signal) for positioning). PRS may comprise PRS resources or PRS resource sets of a frequency layer. A DL PRS positioning frequency layer (or simply a frequency layer) is a collection of DL PRS resource sets, from one or more TRPs, that have common parameters configured by higher-layer parameters DL-PRS-Positioning-FrequencyLayer, DL-PRS-ResourceSet, and DL-PRS-Resource. Each frequency layer has a DL PRS subcarrier spacing (SCS) for the DL PRS resource sets and the DL PRS resources in the frequency layer. Each frequency layer has a DL PRS cyclic prefix (CP) for the DL PRS resource sets and the DL PRS resources in the frequency layer. In 5G, a resource block occupies 12 consecutive subcarriers and a specified number of symbols. Also, a DL PRS Point A parameter defines a frequency of a reference resource block (and the lowest subcarrier of the resource block), with DL PRS resources belonging to the same DL PRS resource set having the same Point A and all DL PRS resource sets belonging to the same frequency layer having the same Point A. A frequency layer also has the same DL PRS bandwidth, the same start PRB (and center frequency), and the same value of comb size (i.e., a frequency of PRS resource elements per symbol such that for comb-N, every $N^{th}$ resource element is a PRS resource element).

A TRP may be configured, e.g., by instructions received from a server and/or by software in the TRP, to send DL PRS per a schedule. According to the schedule, the TRP may send the DL PRS intermittently, e.g., periodically at a consistent interval from an initial transmission. The TRP may be configured to send one or more PRS resource sets. A resource set is a collection of PRS resources across one TRP, with the resources having the same periodicity, a common muting pattern configuration (if any), and the same repetition factor across slots. Each of the PRS resource sets comprises multiple PRS resources, with each PRS resource comprising multiple Resource Elements (REs) that may be in multiple Resource Blocks (RBs) within N (one or more) consecutive symbol(s) within a slot. An RB is a collection of REs spanning a quantity of one or more consecutive symbols in the time domain and a quantity (12 for a 5G RB) of consecutive sub-carriers in the frequency domain. Each PRS resource is configured with an RE offset, slot offset, a symbol offset within a slot, and a number of consecutive symbols that the PRS resource may occupy within a slot. The RE offset defines the starting RE offset of the first symbol within a DL PRS resource in frequency. The relative RE offsets of the remaining symbols within a DL PRS resource are defined based on the initial offset. The slot offset is the starting slot of the DL PRS resource with respect to a corresponding resource set slot offset. The symbol offset determines the starting symbol of the DL PRS resource within the starting slot. Transmitted REs may repeat across slots, with each transmission being called a repetition such that there may be multiple repetitions in a PRS resource. The DL PRS resources in a DL PRS resource set are associated with the same TRP and each DL PRS resource has a DL PRS resource ID. A DL PRS resource ID in a DL PRS resource set is associated with a single beam transmitted from a single TRP (although a TRP may transmit one or more beams).

A PRS resource may also be defined by quasi-co-location and start PRB parameters. A quasi-co-location (QCL) parameter may define any quasi-co-location information of the DL PRS resource with other reference signals. The DL PRS may be configured to be QCL type D with a DL PRS or SS/PBCH (Synchronization Signal/Physical Broadcast Channel) Block from a serving cell or a non-serving cell. The DL PRS may be configured to be QCL type C with an SS/PBCH Block from a serving cell or a non-serving cell. The start PRB parameter defines the starting PRB index of the DL PRS resource with respect to reference Point A. The starting PRB index has a granularity of one PRB and may have a minimum value of 0 and a maximum value of 2176 PRBs.

A PRS resource set is a collection of PRS resources with the same periodicity, same muting pattern configuration (if any), and the same repetition factor across slots. Every time all repetitions of all PRS resources of the PRS resource set are configured to be transmitted is referred as an "instance". Therefore, an "instance" of a PRS resource set is a specified number of repetitions for each PRS resource and a specified number of PRS resources within the PRS resource set such that once the specified number of repetitions are transmitted for each of the specified number of PRS resources, the instance is complete. An instance may also be referred to as an "occasion." A DL PRS configuration including a DL PRS transmission schedule may be provided to a UE to facilitate (or even enable) the UE to measure the DL PRS.

Multiple frequency layers of PRS may be aggregated to provide an effective bandwidth that is larger than any of the bandwidths of the layers individually. Multiple frequency layers of component carriers (which may be consecutive and/or separate) and meeting criteria such as being quasi co-located (QCLed), and having the same antenna port, may be stitched to provide a larger effective PRS bandwidth (for DL PRS and UL PRS) resulting in increased time of arrival measurement accuracy. Being QCLed, the different frequency layers behave similarly, enabling stitching of the PRS to yield the larger effective bandwidth. The larger effective bandwidth, which may be referred to as the bandwidth of an aggregated PRS or the frequency bandwidth of an aggregated PRS, provides for better time-domain resolution (e.g., of TDOA). An aggregated PRS includes a collection of PRS resources and each PRS resource of an aggregated PRS may be called a PRS component, and each PRS component may be transmitted on different component carriers, bands, or frequency layers, or on different portions of the same band.

RTT positioning is an active positioning technique in that RTT uses positioning signals sent by TRPs to UEs and by UEs (that are participating in RTT positioning) to TRPs. The TRPs may send DL-PRS signals that are received by the UEs and the UEs may send SRS (Sounding Reference Signal) signals that are received by multiple TRPs. A sounding reference signal may be referred to as an SRS or an SRS signal. In 5G multi-RTT, coordinated positioning may be used with the UE sending a single UL-SRS for positioning that is received by multiple TRPs instead of sending a separate UL-SRS for positioning for each TRP. A TRP that participates in multi-RTT will typically search for UEs that are currently camped on that TRP (served UEs, with the TRP being a serving TRP) and also UEs that are camped on neighboring TRPs (neighbor UEs). Neighbor TRPs may be TRPs of a single BTS (e.g., gNB), or may be a TRP of one BTS and a TRP of a separate BTS. For RTT positioning, including multi-RTT positioning, the DL-PRS signal and the UL-SRS for positioning signal in a PRS/SRS for positioning signal pair used to determine RTT (and thus used to determine range between the UE and the TRP) may occur close in time to each other such that errors due to UE motion and/or UE clock drift and/or TRP clock drift are within acceptable limits. For example, signals in a PRS/SRS for positioning signal pair may be transmitted from the TRP and the UE, respectively, within about 10 ms of each other. With SRS for positioning signals being sent by UEs, and with PRS and SRS for positioning signals being conveyed close in time to each other, it has been found that radio-frequency (RF) signal congestion may result (which may cause excessive noise, etc.) especially if many UEs attempt positioning concurrently and/or that computational congestion may result at the TRPs that are trying to measure many UEs concurrently.

RTT positioning may be UE-based or UE-assisted. In UE-based RTT, the UE 200 determines the RTT and corresponding range to each of the TRPs 300 and the position of the UE 200 based on the ranges to the TRPs 300 and known locations of the TRPs 300. In UE-assisted RTT, the UE 200 measures positioning signals and provides measurement information to the TRP 300, and the TRP 300 determines the RTT and range. The TRP 300 provides ranges to a location server, e.g., the server 400, and the server determines the location of the UE 200, e.g., based on ranges to different TRPs 300. The RTT and/or range may be determined by the TRP 300 that received the signal(s) from the UE 200, by this TRP 300 in combination with one or more other devices, e.g., one or more other TRPs 300 and/or the server 400, or by one or more devices other than the TRP 300 that received the signal(s) from the UE 200.

Various positioning techniques are supported in 5G NR. The NR native positioning methods supported in 5G NR include DL-only positioning methods, UL-only positioning methods, and DL+UL positioning methods. Downlink-based positioning methods include DL-TDOA and DL-AoD. Uplink-based positioning methods include UL-TDOA and UL-AoA. Combined DL+UL-based positioning methods include RTT with one base station and RTT with multiple base stations (multi-RTT).

A position estimate (e.g., for a UE) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence).

Line-of-Sight/Non-Line-of-Sight Determination and Use

Various techniques may be implemented to determine whether a signal received by a target UE from another UE is a line-of-sight (LOS) transmission or a non-line-of-sight (NLOS) transmission, and thus whether the UE is LOS or NLOS with respect to the other UE. The target UE is the UE for which a location is to be determined and an anchor UE is a UE with a known location, even though the location may not be known at the time of signal exchange between the target UE and the anchor UE. The use of an NLOS signal between the anchor UE and the target UE to determine range between the target UE and the anchor UE may result in an incorrect (longer than actual) range being determined. If this incorrect range is used to determine the location of the target UE, then the determined location will likely be incorrect, and may be unacceptably incorrect (i.e., in error more than an acceptable threshold error). Situations arise where the target UE (e.g., a vehicle UE in a V2X context) is out of coverage of and the target UE uses anchor UEs to determine ranges between the target UE and the anchor UEs to determine location of the target UE. Determining whether a PRS from an anchor UE is LOS/NLOS without the help of infrastructure such as a gNB is useful to help ensure the accuracy of the determined location for the target UE.

Figure 5:
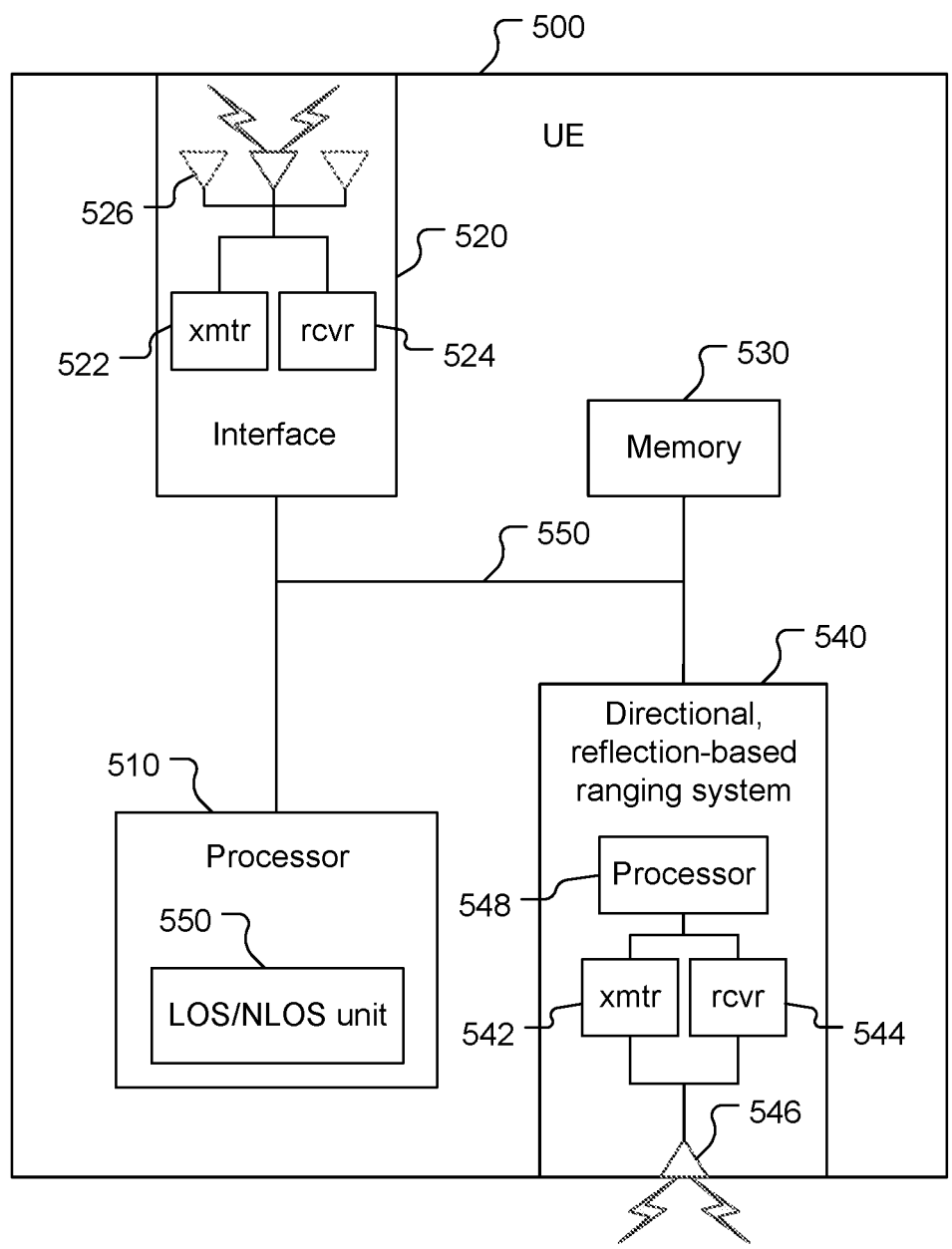
FIG. 5 is a block diagram of an example user equipment.

Referring to FIG. 5, with further reference to FIGS. 1-4, a UE 500 includes a processor 510, an interface 520, a memory 530, and a directional, reflection-based ranging system 540 communicatively coupled to each other by a bus 550. The UE 500 may include the components shown in FIG. 5, and may include one or more other components such as any of those shown in FIG. 2 such that the UE 200 may be an example of the UE 500. For example, the processor 510 may include one or more of the components of the processor 210. The interface 520 may include one or more of the components of the transceiver 215. For example, the interface 520 includes a wireless transmitter 522, a wireless receiver 524, and an antenna 526, e.g., corresponding to the wireless transmitter 242, the wireless receiver 244, and the antenna 246. The interface 520 may include more than one antenna 526, e.g., to facilitate electric beam steering of a communication beam, and/or the antenna(s) 526 may be configured with multiple elements configured (e.g., in combination with the wireless transmitter 522 and/or the wireless receiver 524) for electric beam steering. In this example, three antennas 526 are shown (with two of the antennas 526 being shown as being optional), but the UE 500 may be configured with other quantities of antennas. The processor 510 is configured to steer the antenna(s) 526 to point in different directions. For example, the processor 510 may electronically steer the antenna(s) 526 by controlling phases applied to signals transmitted by different elements of the antenna(s) 526, and/or different ones of the antennas 526 (with more than one antenna 526 present), and controlling phases applied to signals received by different antenna elements of the antenna(s) 526, and/or applied to different ones of the antennas 526. The processor 510 may, for example, determine an AoA of a signal (e.g., a PRS) from another UE based on the direction of the beam of the antenna(s) 526 when the signal is received. Also or alternatively, the interface 520 may include the wired transmitter 252 and/or the wired receiver 254. The memory 530 may be configured similarly to the memory 211, e.g., including software with processor-readable instructions configured to cause the processor 510 to perform functions.

The ranging system 540 is configured to use reflections of transmitted signals to determine locations of objections in terms of angles to the objects relative to a coordinate system of the UE 500 and distances to the objects. The ranging system 540 includes a wireless transmitter 542, a wireless receiver 544, and an antenna 546 (which may comprise a single antenna element, multiple antenna elements, and/or multiple antennas). For example, separate antennas may be used for signal transmission and reflected signal reception, although the discussion herein refers to a single antenna. The ranging system 540 transmits signals from the wireless transmitter 542 via the antenna 546 and receives reflections of the transmitted signals by the wireless receiver 544 via the antenna 546. The ranging system 540 may include a processor 548, communicatively coupled to the wireless transmitter 542 and the wireless receiver 544 (and possibly to a memory, not shown). The processor 548 is configured to steer the antenna 546 to point in different directions. For example, the processor 548 may electronically steer the antenna 546 by controlling phases applied to signals transmitted by different elements of the antenna 546 and applied to signals received by different elements of the antenna 546. The processor 548 may, for example, cause the antenna 546 to rotate a beam of the antenna 546, e.g., at a constant angular rate. The ranging system 540 may be turned off during times that the UE 500 is not collecting information, e.g., measuring PRS, for use in determining the location of the UE 500. The processor 548 may be configured to analyze time of departure of transmitted signals and time of arrival of reflected signals to determine distance from the UE 500 to an object, computing the distance between the UE 500 and the object as the difference in arrival and departure times divided by the speed of light. Also or alternatively, the processor 548 may be configured to determine the distance between the UE 500 and the object based on the transmitted signal power and the received signal power. The processor 548 is also configured to determine, for each determined distance, the direction of the object relative to the UE 500 based on the direction of the transmitted signal (e.g., as electronically steered by the processor 548). Some or all of the processor 548 may be disposed in the processor 510, i.e., the processor 548 may not be physically separate from the processor 510.

The ranging system 540 may take a variety of forms. For example, the ranging system may be a radar (radio detection and ranging) system, a lidar (light detection and ranging) system, a sonar (sound navigation and ranging) system, and/or or reflection-based ranging system. The ranging system 540 is directional in that a beamwidth produced by the antenna 526 is sufficiently narrow to enable the ranging system 540 to determine meaningful information regarding the directions of objects relative to the UE 500. For example, the antenna 526 may have a beamwidth of about 1°-2° and the ranging system 540 may provide directions to objects relative to the UE 500 with about +/−0.2° of error. These values of beamwidth and angular error are examples only, and ranging systems with other beamwidths and/or errors may be used.

The description herein may refer only to the processor 510 performing a function, but this includes other implementations such as where the processor 510 executes software (stored in the memory 530) and/or firmware. The description herein may refer to the UE 500 performing a function as shorthand for one or more appropriate components (e.g., the processor 510 and the memory 530) of the UE 500 performing the function. The processor 510 (possibly in conjunction with the memory 530 and, as appropriate, the interface 520) includes an LOS/NLOS unit 550 (line-of-sight/non-line-of-sight unit). The LOS/NLOS unit 550 is configured to determine whether another UE is within a line of sight of the UE 500 or is in a non-line-of-sight relationship relative to the UE 500 (e.g., a line of sight between the UE 500 and the other UE is blocked or obscured). The LOS/NLOS unit 550 is configured to determine whether an angle between the UE 500 and the other UE determined by the ranging system 540 corresponds to (e.g., is within an angular threshold difference of) an angle determined from reception of one or more communication signals and, for angles that correspond, to determine whether the distances corresponding to the ranging and communication signals correspond (e.g., are within a distance threshold difference). The LOS/NLOS unit 550 is configured to conclude that an LOS condition exists between the UE 500 and another UE based on the distances corresponding and to conclude that the other UE is NLOS with respect to the UE 500 if the angles correspond but the distances do not. The LOS/NLOS unit 550 is discussed further below, and the description may refer to the processor 510 generally, or the UE 500 generally, as performing any of the functions of the LOS/NLOS unit 550.

Figure 6:
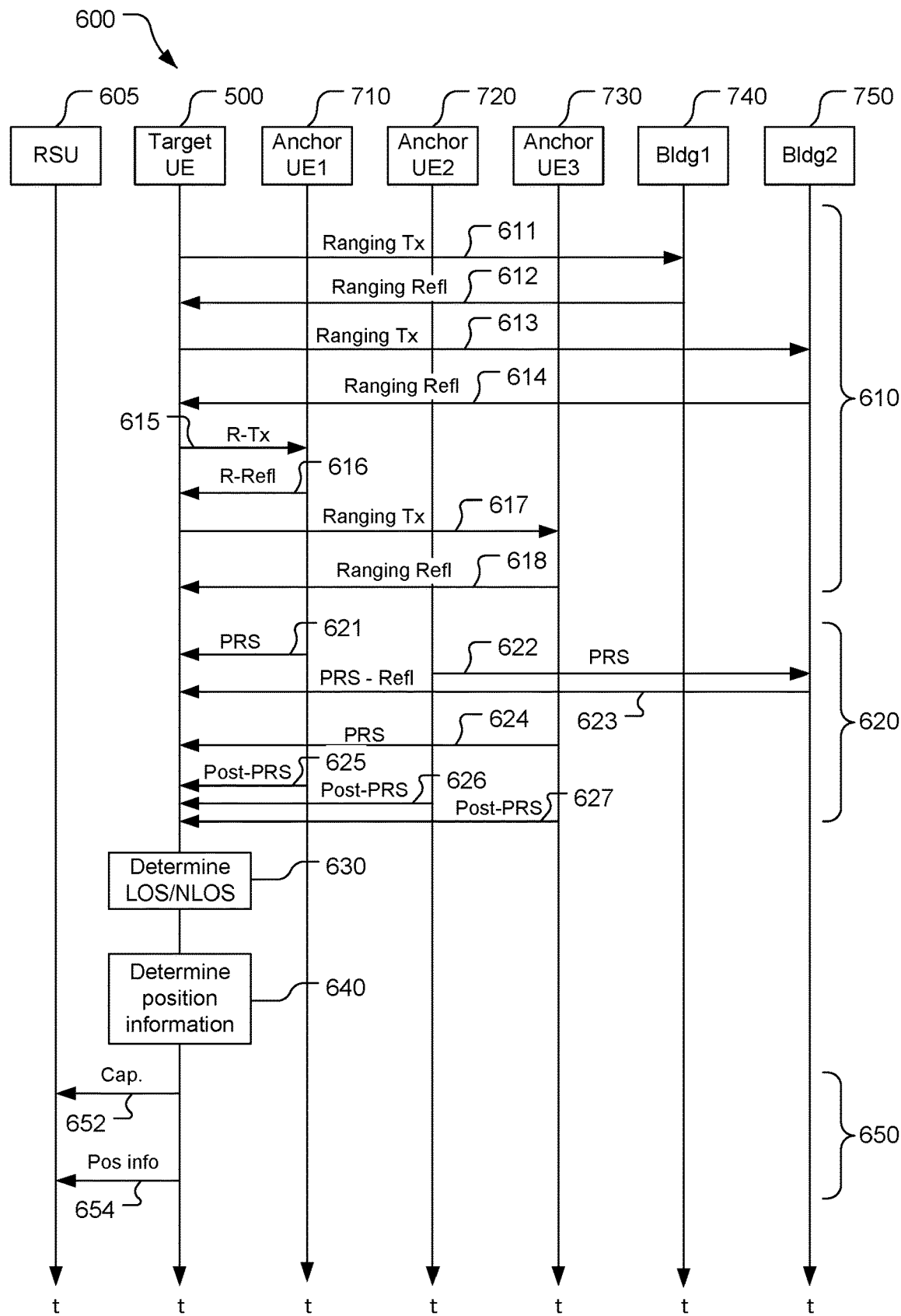
FIG. 6 is a signaling and process flow for determining line-of-sight status of a positioning reference signal source, determining position information, and determining map information.
Figure 7:
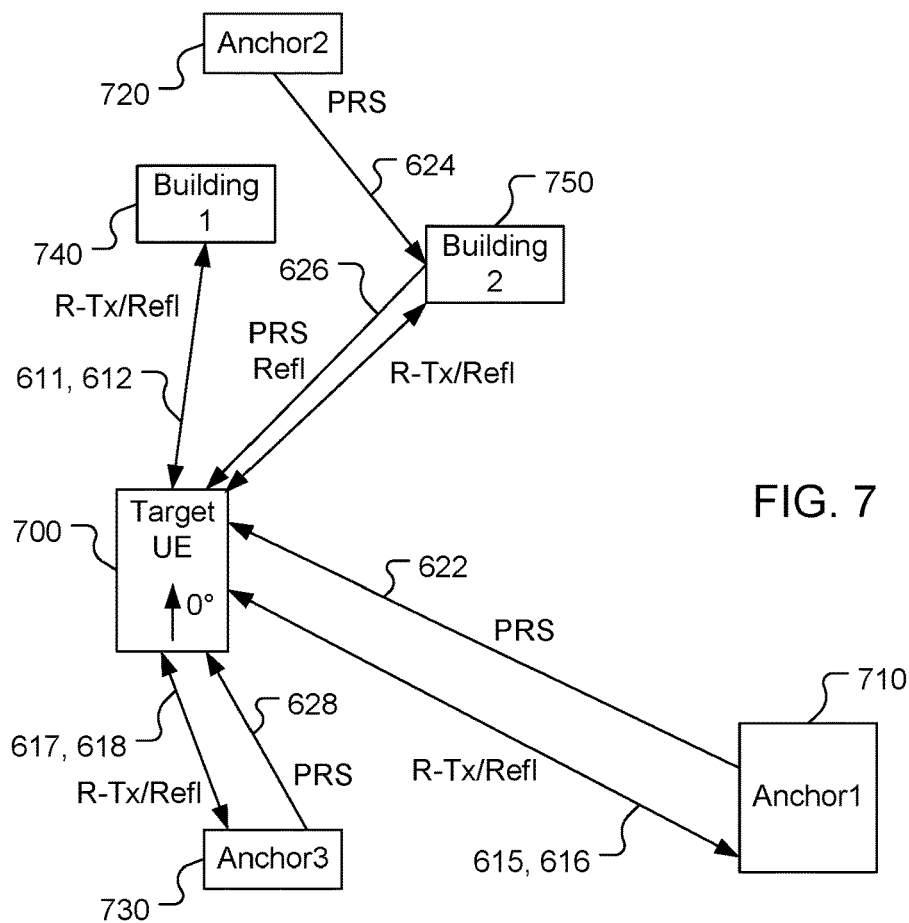
FIG. 7 is a simplified diagram of an environment of a target user equipment (UE), anchor UEs, and buildings.

Referring to FIGS. 6 and 7, with further reference to FIGS. 1-5, a signaling and process flow 600 for determining whether PRS is LOS, determining position information from LOS PRS, and determining map information from the position information includes the stages shown. The flow 600 is an example only, as stages may be added, rearranged, and/or removed. For example, the timing shown in FIG. 6 is an example, as stages may occur in different orders than as shown (e.g., one or more reflection-based ranging stages occurring after one or more PRS exchanges). In the flow 600, a target UE 700 interacts with an anchor UE 710, an anchor UE 720, an anchor UE 730, a building 740, a building 750, and an RSU 605 (Roadside Unit), with the UEs 700, 710, 720, 730, and the buildings 740, 750 disposed in a layout shown in FIG. 7. This is an example only, and other layouts and other quantities and types of entities are possible. The target UE 700 is an example of the UE 500, and the anchor UEs 710, 720, 730 may be examples of the UE 500, e.g., with or without the ranging system 540. The RSU 605 may be an example of the TRP 300.

At stage 610, the target UE 700 performs reflection-based ranging to the anchor UE 710, the anchor UE 730, the building 740, and the building 750. For illustration purposes, the ranging system 540 begins transmitting ranging signals from 0° relative to the target UE 700 as shown in FIG. 7, and rotates the antenna 546 clockwise from the perspective of FIG. 7. Consequently, due to the layout shown in FIG. 7, the ranging system 540 encounters the building 740, the building 750, the anchor UE 710, and the anchor UE 730 in that order. The ranging system 540 sends a ranging Tx signal 611 that is reflected by the building 740 to produce a ranging reflection signal 612 that is received by the ranging system 540. Similarly, the ranging system 540 sends ranging Tx signals 613, 615, 617 that are respectively reflected by the building 750, the anchor UE 710, and the anchor UE 730, to produce ranging reflection signals 614, 616, 618 that are received by the ranging system 540. The ranging Tx signals 611, 613, 615, 617 may be, for example, radio frequency (RF) signals for a radar system, light signals for a lidar system, sound signals (e.g., ultrasound signals) for a sonar system, etc.

Figure 8:
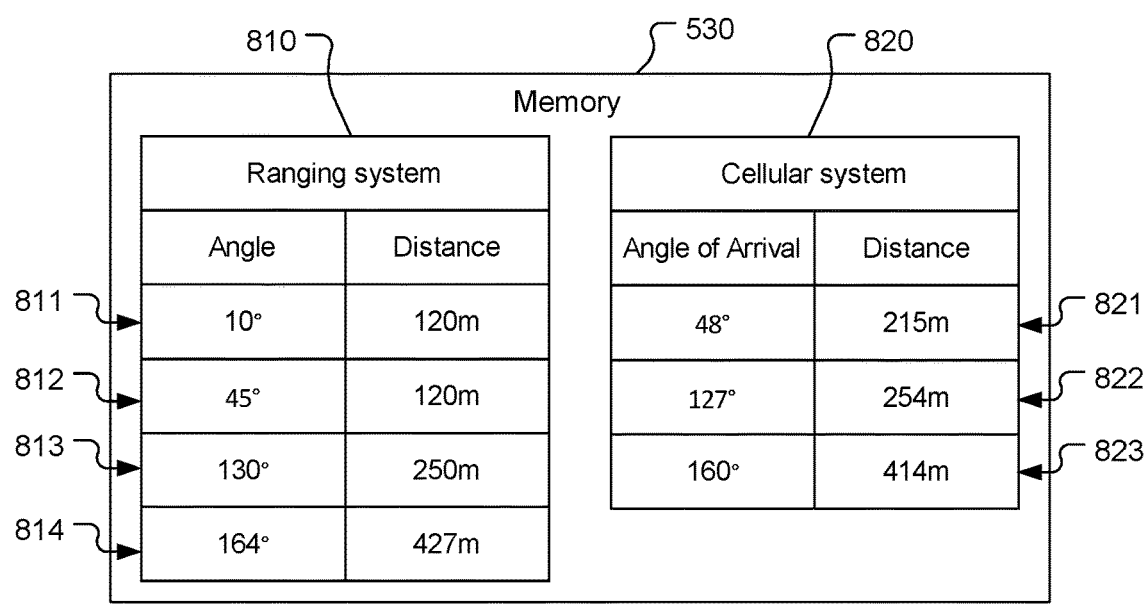
FIG. 8 is a simplified diagram of a memory containing databases of ranging-system-determined angles and distances to reflectors, and positioning-reference-signal-based angles of arrival of signals from, and distances to, sources of positioning reference signals.

Ranges to the buildings 740, 750 and to the anchor UEs 710, 730 may be determined based on, e.g., upon receipt of, the respective ranging reflection signals 612, 614, 616, 618. For each reflected ranging signal received, the ranging system 540 (e.g., the processor 548) determines the angle, relative to the target UE 700, of the object that reflected the ranging Tx signal. For example, because the time for the ranging Tx signal to be sent, reflected, and the ranging reflection received by the target UE 700 will be nearly instantaneous for any object within range of the ranging system 540 (even considering the rotation of the beam and possible movement of the target UE 700, such as a vehicle), the ranging system 540 may determine a present angle of the beam from the antenna 546 when the ranging reflection is received to be the angle of the object relative to the target UE 700. The ranging system 540 may determine the distance to the object that reflects the ranging Tx signal (i.e., the distance to a reflector) using round trip time of the ranging Tx signal and the ranging reflection signal, and/or the transmit power of the ranging Tx signal and the received power of the ranging reflection signal. Further, the ranging system 540 (e.g., the processor 548) determines the respective distance to the reflector for each angle yielding a reflection. Referring also to FIG. 8, for the example layout of FIG. 7, analysis of the ranging Tx signals and ranging reflections yields four angles and four corresponding distances to reflectors (here, the buildings 740, 750 and the anchor UEs 710, 730). The ranging system 540 or the processor 510 may store the determined angles and distances in the memory 530. In this example, the processor 548 determines from the ranging Tx signal 611 and the ranging reflection 612 that an object (here the building 740) is at 10° (with 0° relative to the target UE 700 directed as shown in FIG. 7) at a distance of 120 m. The processor 548 determines from the ranging Tx signals 613, 615, 617 and the respective ranging reflection signals 614, 616, 618 that objects are disposed at 45°, 130°, and 164° relative to the target UE 700 at respective distances of 120 m, 250 m, 427 m from the target UE 700. Here, the angles and distances are stored in a database 810 in entries 811, 812, 813, 814. The ranging-system-determined angles in the database 810 form a set $\alpha$ of angles, and the ranging-system-determined distances form a set $\beta$ (although $\alpha$ or $\beta$ could each contain a single value or multiple values).

At stage 620, the target UE 700 receives PRS from the anchor UEs 710, 720, 730. The anchor UEs 710, 730 are LOS with the target UE 700 as shown in FIG. 7, while the anchor UE 720 is NLOS with the target UE 700, with the building 740 disposed between the target UE 700 and the anchor UE 720. Thus, the anchor UEs 710, 730 send PRS 621, 624 that travel directly to the target UE 700 while the anchor UE 720 sends PRS 622 that is reflected by the building 750 to produce a PRS reflection 623 that is received by the target UE 700. The processor 510 may determine the AoA of each PRS, e.g., by determine the steering angle of the antenna(s) 526 when the PRS (or PRS reflection) was received. The processor 510 may also determine a respective distance traveled by each PRS from the respective anchor UE to the target UE 700. For example, the anchor UEs 710, 720, 730 may send respective post-PRS signals 625, 626, 627 that indicate the respective time of departure of the PRS 621, 622, 624, and the location of the respective anchor UE 710, 720, 730. The processor 510 may receive indications of the times of departure, and obtain (e.g., from the memory 530) respective first times of arrival of each of the PRS 621, 624 and the PRS reflection 623. The processor 510 may determine the distances traveled by the PRS 621, 624, and the PRS 622 and the PRS reflection 623 based on differences of the respective times of departure of the PRS 621, 622, 624 and the respective first times of arrival of the PRS 621, 622 and the PRS reflection 623, divided by the speed of light. If the processor 510 is configured to detect multiple receptions of the same PRS (e.g., the two strongest instances of a PRS), then multiple angles may be close together. Here, the AoAs and corresponding distances are stored in the memory 530 in a database 820 in entries 821, 822, 823. The PRS-based angles in the database 820 form a set $\gamma$ of angles, and the PRS-based distances in the database 820 form a set $\delta$ (although $\gamma$ or $\delta$ could each contain a single value or multiple values).

At stage 630, the target UE 700 determines whether each of the received PRS is from an anchor UE that is LOS or NLOS with respect to the target UE 700. The LOS/NLOS unit 550 is configured to determine whether an AoA determined by the processor 510 corresponds to an object angle determined by the ranging system 540. For example, the LOS/NLOS unit 550 may be configured to determine whether an angle in the set $\gamma$ corresponds to an angle in the set $\alpha$ (i.e., whether $\gamma_x \in \alpha$). An AoA may be considered to correspond to a ranging-system-determined angle if the AoA is within an angular threshold closeness (e.g., within a threshold number of degrees (e.g., 2° or 3° or 5°)) of the ranging-system-determined angle. The angular threshold may be dynamic, e.g., depending on an AoA accuracy achievable by processor 510 from analysis of the PRS (e.g., based on a number of antenna elements of the antenna(s) 526, antenna element spacing, and/or duration of the ranging session, which may correlate to an AoA resolution achievable from analysis of signals received by the antennas 526). The ranging-system-determined angle may be a range of angles (e.g., a reflector may span a range of angles). The AoA may be considered to correspond to such a range of angles if the AoA is contained by the range of angles, or within a threshold closeness of either end of the range of angles. The LOS/NLOS unit 550 is configured to determine whether a distance determined by the processor 510 corresponds to an object distance determined by the ranging system 540 for an AoA that corresponds to a ranging-system-determined angle. For example, the LOS/NLOS unit 550 may be configured to determine, for an AoA $\gamma_x$ that corresponds to a ranging-system-determined angle $\alpha_x$, whether the PRS-based distance $\delta_x$ for the AoA $\gamma_x$ corresponds to the ranging-system-determined distance $\beta_x$ for the angle $\alpha_x$. A PRS-based distance may be considered to correspond to a ranging-system-determined distance if the PRS-based distance is within a threshold closeness (e.g., within a threshold percentage (e.g., 5% or 10% or 20%)) of the ranging-system-determined distance.

The LOS/NLOS unit 550 may be configured to determine the LOS/NLOS status of an anchor UE based on the AoAs in $\gamma$ and corresponding distances in $\delta$ and the ranging-system-determined angles in $\alpha$ and corresponding distances in $\beta$ according to the following:

If $\gamma_x \in \alpha$ (with $\gamma_x \approx \alpha_y$) and $\delta_x \approx \beta_y$, then anchor $UE_x$ is LOS with target UE; or If $\gamma_x \in \alpha$ (with $\gamma_x \approx \alpha_y$) and $\delta_x \not\approx \beta_y$, then anchor $UE_x$ is NLOS with target UE; or If $\gamma_x \notin \alpha$, then LOS/NLOS status is indeterminate.

Thus, if a determined AoA ($\gamma_x$) is an element of the set $\alpha$ in that the AoA corresponds to (e.g., is within a threshold of) a ranging-system-determined angle ($\alpha_y$) (i.e., $\gamma_x \in \alpha$ in that $\gamma_x \approx \alpha_y$) and the distance ($\delta_x$) determined from the PRS for this AoA corresponds to (e.g., is within a threshold of) the ranging-system-determined distance ($\beta_y$) for the ranging-system-determined angle corresponding to the AoA (i.e., $\delta_x \approx \beta_y$), then the LOS/NLOS unit 550 determines that the respective anchor UE is LOS with the target UE 700. For example, with an angle threshold of 3° and a distance threshold of 5%, the AoA of 127° ($\gamma_x$) of the entry 822 is within the threshold of the ranging-system-determined angle of 130° ($\alpha_y$) of the entry 813, and the PRS-determined distance of 254 m ($\delta_x$) of the entry 822 is within the distance threshold of the ranging-system-determined distance of 250 m ($\beta_y$) of the entry 813. The LOS/NLOS unit 550 will thus conclude that the anchor UE 710 (that sent the PRS from which the AoA of 127° was determined) is LOS with respect to the target UE 700. Conversely, if a determined AoA ($\gamma_x$) is an element of the set $\alpha$ (e.g., $\gamma_x \approx \alpha_y$) and the respective PRS-determined distance ($\delta_x$) does not correspond to (e.g., is outside a threshold closeness of) the ranging-system-determined distance ($\beta_y$) (i.e., $\delta_x \not\approx \beta_y$), then the LOS/NLOS unit 550 determines that the respective anchor UE is NLOS with the target UE 700. For example, with an angle threshold of 3° and a distance threshold of 5%, the AoA of 48° ($\gamma_x$) of the entry 821 is within the threshold of the ranging-system-determined angle of 45° ($\alpha_y$) of the entry 812, and the PRS-determined distance of 215 m ($\delta_x$) of the entry 821 is outside the distance threshold of the ranging-system-determined distance of 120 m ($\beta_y$) of the entry 812. The PRS-determined distance of 215 m (for the PRS reflection 626) is much longer than the ranging-system-determined distance of 120 m (to the building 750) due to the extra path length of the PRS 624 from the anchor UE 720 to the building 750. The LOS/NLOS unit 550 will thus conclude that the anchor UE 720 (that sent the PRS from which the AoA of 48° was determined) is NLOS with respect to the target UE 700. If a determined AoA for a received PRS (or PRS reflection) does not correspond to a ranging-system-determined angle (i.e., $\gamma_x \notin \alpha$ because $\gamma_x$ is not within the angular threshold of any angle in the set $\alpha$), then the LOS/NLOS unit 550 will conclude that the LOS/NLOS status of the corresponding anchor UE (corresponding to the AoA $\gamma_x$) is indeterminate, and use a conventional technique to determine the LOS/NLOS status of the anchor UE. For example, with an angle threshold of 3°, the AoA of 160° of the entry 823 is not within the angle threshold of any of the ranging-system-determined angles in the database 810. The LOS/NLOS unit 550 will thus conclude that the LOS/NLOS status of the anchor UE 730 (that sent the PRS from which the AoA of 160° was determined, e.g., as determined from a PRS pattern corresponding to the anchor UE 730) is unsure, and in response may use one or more other techniques to determine the LOS/NLOS status of the anchor UE 730.

The LOS/NLOS unit 550 may be configured to use the angle set α and the distance set β to determine LOS/NLOS status of a PRS source for a limited time. Thus, a validity of the angle and distance sets may be time limited, e.g., because angles and distances to PRS sources will change as the UE 500 moves. The LOS/NLOS unit 550 may adjust a validity time based on motion of the UE 500. For example, the LOS/NLOS unit 550 may extend the validity time indefinitely as long as the UE 500 is static.

Referring in particular again to FIG. 6, at stage 640, the target UE 700 determines position information. For example, the processor 510 may one or more PRS measurements, one or more ranges, and/or one or more location estimates for the target UE 700. One or more measurements (e.g., PRS measurements) and one or more ranges are determined at stage 630, and one or more additional measurements and/or one or more additional ranges may be determined at stage 640. The processor 510 may use the LOS/NLOS knowledge to select measurements only for PRS that were LOS to the UE 500 to determine the position information, which may improve the accuracy of the position information.

At stage 650, the target UE provides capability information and position information to the server 400. The target UE 500 may send a capability message 652 to the server 400 indicating that the target UE 700 has a reflection-based ranging system. The capability message may be separate from or included with a position information report 654 sent by the target UE 700 to the server 400. The capability message 652 may be explicit or implicit (e.g., due to inclusion of one or more indications that LOS/NLOS for one or more corresponding PRS-based position information items was determined by reflection-based ranging). The position information report 654 may indicate whether position information was determined from PRS from a PRS source (e.g., an anchor UE) that was LOS or NLOS if the LOS/NLOS determination was made by the LOS/NLOS unit 550 (i.e., was not indeterminate). For example, for each PRS for which the corresponding anchor UE was determined to be LOS or NLOS, the position information derived from the PRS may be associated in the position information report 654 with an indication of LOS or NLOS, as appropriate. The position information report 654 may include the ranging-system-determined angle set α and the ranging-system-determined distance set β. While the target UE 700 sends the position report 654 to the server 400 in the flow 600, the position report 654 may also or alternatively be sent to one or more other entities such as a static (stationary) UE, a roadside unit (RSU), etc. Other UEs may use Tx/Rx and LOS/NLOS pair information (e.g., Tx/Rx locations and whether there is an LOS or NLOS condition at the location (s)) regarding performing ranging at the indicated location (s) (e.g., saving energy by not attempting ranging at a location if an NLOS condition is indicated for the location).

Figure 9:
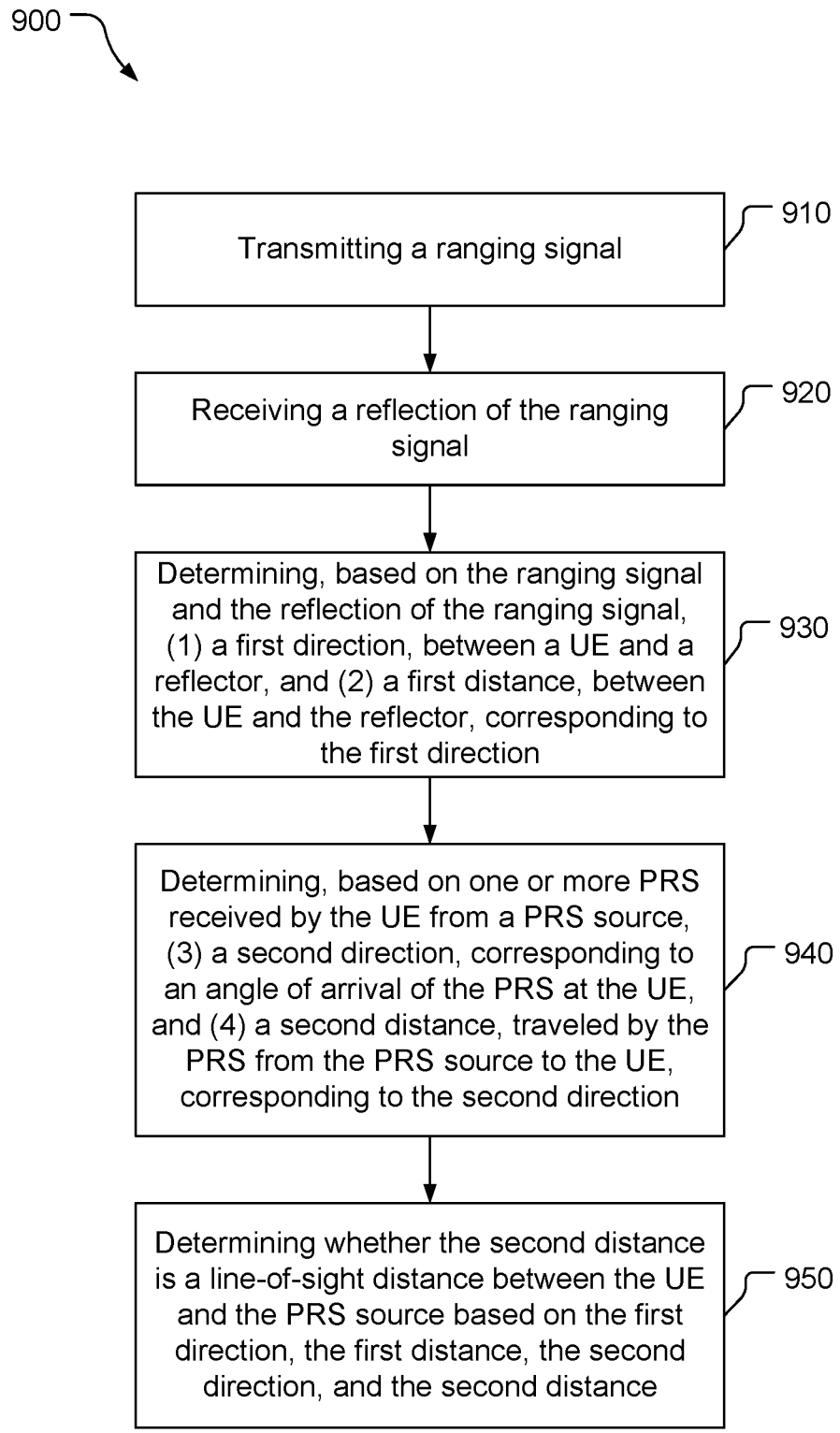
FIG. 9 is a block flow diagram of a method for determining a line-of-sight relationship between a user equipment and a positioning reference signal source.

Referring to FIG. 9, with further reference to FIGS. 1-8, a method 900 of determining a line-of-sight relationship between a UE and a PRS source includes the stages shown. The method 900 is, however, an example only and not limiting. The method 900 may be altered, e.g., by having stages added, removed, rearranged, combined, performed concurrently, and/or having single stages split into multiple stages.

At stage 910, the method 900 includes transmitting a ranging signal. For example, the ranging system 540 sends a ranging signal such as an RF signal, a light signal, or a sound signal via the antenna 546. As shown in FIGS. 6 and 7, the ranging system 540 sends ranging Tx signals 611, 613, 615, 617 toward the buildings 740, 750 and the anchor UEs 710, 730. The processor 548, possibly in combination with the memory 530, and the wireless transmitter 542 and the antenna 546 may comprise means for transmitting the ranging signal.

At stage 920, the method 900 includes receiving a reflection of the ranging signal. For example, one or more ranging signals hit one or more reflectors that reflect the ranging signal(s) and the ranging system 540 receives the reflection (s) of the ranging Tx signal(s). As shown in FIGS. 6 and 7, the ranging Tx signals 611, 613, 615, 617 are reflected into ranging reflection signals 612, 614, 616, 618 that the ranging system 540 receives. The processor 548, possibly in combination with the memory 530 and/or the processor 510, and the wireless receiver 544 and the antenna 546 may comprise means for receiving the reflection of the ranging signal.

At stage 930, the method 900 includes determining, based on the ranging signal and the reflection of the ranging signal, (1) a first direction, between the UE and a reflector, and (2) a first distance, between the UE and the reflector, corresponding to the first direction. For example, the processor 548 uses information from the ranging Tx signal(s) and the ranging reflection signal(s) to determine angle and distance to a reflecting object (e.g., using time of departure and arrival of the transmitted and reflected signals and/or powers of the transmitted and reflected signals). The processor 548 may, for example, determine the angles and the distances in the database 810 in the example layout of FIG. 7. The processor 548, possibly in combination with memory such as the memory 530, may comprise means for determining the first direction and the first distance.

At stage 940, the method 900 includes determining, based on a PRS received by the UE from the PRS source, (3) a second direction, corresponding to an angle of arrival of the PRS at the UE, and (4) a second distance, traveled by the PRS from the PRS source to the UE, corresponding to the second direction. For example, the processor 510 may analyze received PRS and post-PRS signaling to determine AoA to an anchor UE and distance from the anchor UE to the UE 500 along the path traveled by the PRS. For example, using the PRS 621, 624 and the PRS reflection 623 the processor 510 can determine times of arrival and from the post-PRS signals 625-627 the processor determines times of departure of the PRS 621, 622, 624, from which the processor 510 determines travel time and thus estimated distance between the target UE 700 and the anchor UEs 710, 720, 730 as shown in the database 820. The determined distance will not be the LOS distance if the PRS used to determine time of arrival was a PRS reflection. The processor 548, possibly in combination with memory such as the memory 530, may comprise means for determining direction and distance between the UE and the PRS source.

At stage 950, the method 900 includes determining whether the second distance is a line-of-sight distance between the UE and the PRS source based on the first direction, the first distance, the second direction, and the second distance. For example, the LOS/NLOS unit 550 analyzes the determined angles and distances, e.g., in the databases 810, 820, to determine LOS/NLOS status of one or more PRS sources, e.g., anchor UEs, relative to the UE. The processor 510, possibly in combination with the memory 530, may comprise means for determining whether the second distance is a line-of-sight distance between the UE and the PRS source.

Implementations of the method 900 may include one or more of the following features. In an example implementation, determining whether the second distance is the line-of-sight distance between the UE and the PRS source comprises determining that the second distance is the line-of-sight distance between the UE and the PRS source based on the first direction and the second direction being within a first threshold closeness and based on the first distance and the second distance being within a second threshold closeness. For example, the LOS/NLOS unit 550 selects a PRS-determined angle (i.e., an AoA determined from received PRS) and first determines whether a ranging-system-determined angle corresponds to (e.g., is within a threshold closeness of) this PRS-determined angle. If the selected AoA corresponds to a ranging-system-determined angle, then the LOS/NLOS unit 550 may determine whether the respective distances (i.e., the PRS-determined distance and the ranging-system-determined distance) correspond (e.g., are within a threshold closeness). If the distances correspond, then the LOS/NLOS unit 550 determines that the PRS source is LOS with respect to the UE. In another example implementation, the method 900 comprises determining the first threshold based on an angular accuracy of the second direction. For example, the LOS/NLOS unit 550 may select a value of the first threshold based on one or more indications of an accuracy of the PRS-determined angle (e.g., an indication of an error range of a determined angle). The processor 510, possibly in combination with the memory 530, possibly in combination with the interface 520 (e.g., the wireless receiver 524 and the antenna(s) 526), may comprise means for determining the first threshold. In another example implementation, determining the first threshold comprises determining the first threshold based on a quantity of antenna elements used to determine the second direction between the UE and the PRS source. For example, the LOS/NLOS unit 550 may select a value of the first threshold based on an indication of the number of antenna elements that were used to receive the PRS because that quantity may be directly related to a resolution of the AoA.

Also or alternatively, implementations of the method 900 may include one or more of the following features. In an example implementation, determining whether the second distance is the line-of-sight distance between the UE and the PRS source comprises determining that the second distance is a non-line-of-sight distance between the UE and the PRS source based on the first direction and the second direction being within a first threshold closeness and based on the first distance and the second distance being outside of a second threshold closeness. For example, the LOS/NLOS unit 550 selects a PRS-determined angle (i.e., an AoA determined from received PRS) and first determines whether a ranging-system-determined angle corresponds to (e.g., is within a threshold closeness of) this PRS-determined angle. If the selected AoA corresponds to a ranging-system-determined angle, then the LOS/NLOS unit 550 may determine whether the respective distances (i.e., the PRS-determined distance and the ranging-system-determined distance) correspond (e.g., are within a threshold closeness). If the distances do not correspond, then the LOS/NLOS unit 550 determines that the PRS source is NLOS with respect to the UE. In another example implementation, the method 900 comprises sending a report comprising position information determined from the one or more PRS and at least one line-of-sight/non-line-of-sight indication indicating whether the position information is based on a line-of-sight measurement or a non-line-of-sight measurement. For example, the LOS/NLOS unit 550 may send the position information report 654 to another entity (e.g., the server 400, the TRP 300, a roadside unit, etc.), with the report 654 indicating position information (e.g., one or more measurements and/or one or more location estimates for the UE 500) and whether the position information was determined using a PRS from a source that was LOS or NLOS with respect to the UE 500. The processor, possibly in combination with the memory, in combination with the interface 520 (e.g., the wireless transmitter 522 and the antenna(s) 526 and/or a wired transmitter) may comprise means for sending the report.

Other Considerations

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

As used herein, the term RS (reference signal) may refer to one or more reference signals and may apply, as appropriate, to any form of the term RS, e.g., PRS, SRS, CSI-RS, etc.

As used herein, unless otherwise stated, a statement that a function or operation is "based on" an item or condition means that the function or operation is based on the stated item or condition and may be based on one or more items and/or conditions in addition to the stated item or condition.

Also, as used herein, "or" as used in a list of items prefaced by "at least one of" or prefaced by "one or more of" indicates a disjunctive list such that, for example, a list of "at least one of A, B, or C," or a list of "one or more of A, B, or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B means that the item may be configured to perform the function regarding A, or may be configured to perform the function regarding B, or may be configured to perform the function regarding A and B. For example, a phrase of "a processor configured to measure at least one of A or B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. A UE (user equipment) comprising:
a memory;
a wireless transceiver;
a directional, reflection-based ranging system configured to determine directions between the UE and reflectors and corresponding distances between the UE and the reflectors; and
a processor, communicatively coupled to the memory, the wireless transceiver, and the directional, reflection-based ranging system and configured to:
obtain, from the ranging system (1) a first direction, between the UE and a particular reflector, and (2) a first distance, between the UE and the particular reflector, corresponding to the first direction;
determine, based on a positioning reference signal (PRS) received by the wireless transceiver from a PRS source (3) a second direction, corresponding to an angle of arrival of the PRS at the UE, and (4) a second distance, traveled by the PRS from the PRS source to the UE, corresponding to the second direction; and
determine whether the second distance is a line-of-sight distance between the UE and the PRS source based on the first direction, the first distance, the second direction, and the second distance,
wherein the processor is configured to determine that: (i) the second distance is the line-of-sight distance between the UE and the PRS source based on the first direction and the second direction being within a first threshold closeness and based on the first distance and the second distance being within a second threshold closeness.

2. The UE of claim 1, wherein the processor is configured to determine the first threshold based on an angular accuracy of the second direction.

3. The UE of claim 2, wherein the processor is configured to determine the first threshold based on a quantity of antenna elements of the wireless transceiver used to receive one or more PRS.

4. The UE of claim 1, wherein the processor is configured to send a report, via the wireless interface, comprising position information determined from the one or more PRS and at least one line-of-sight/non-line-of-sight indication indicating whether the position information is based on a line-of-sight measurement or a non-line-of-sight measurement.

5. The UE of claim 4, wherein the position information comprises a location estimate of the UE.

6. A UE (user equipment) comprising:
a memory;
a wireless transceiver;
a directional, reflection-based ranging system configured to determine directions between the UE and reflectors and corresponding distances between the UE and the reflectors; and
a processor, communicatively coupled to the memory, the wireless transceiver, and the directional, reflection-based ranging system and configured to:
obtain, from the ranging system (1) a first direction, between the UE and a particular reflector, and (2) a first distance, between the UE and the particular reflector, corresponding to the first direction;
determine, based on a positioning reference signal (PRS) received by the wireless transceiver from a PRS source (3) a second direction, corresponding to an angle of arrival of the PRS at the UE, and (4) a second distance, traveled by the PRS from the PRS source to the UE, corresponding to the second direction; and
determine whether the second distance is a line-of-sight distance between the UE and the PRS source based on the first direction, the first distance, the second direction, and the second distance,
wherein the processor is configured to determine that the second distance is a non-line-of-sight distance between the UE and the PRS source based on the first direction and the second direction being within a first threshold closeness and based on the first distance and the second distance being outside of a second threshold closeness.

7. A UE (user equipment) comprising:
a memory;
a wireless transceiver;
a directional, reflection-based ranging system configured to determine directions between the UE and reflectors and corresponding distances between the UE and the reflectors; and
a processor, communicatively coupled to the memory, the wireless transceiver, and the directional, reflection-based ranging system and configured to:
obtain, from the ranging system (1) a first direction, between the UE and a particular reflector, and (2) a first distance, between the UE and the particular reflector, corresponding to the first direction;
determine, based on a positioning reference signal (PRS) received by the wireless transceiver from a PRS source (3) a second direction, corresponding to an angle of arrival of the PRS at the UE, and (4) a second distance, traveled by the PRS from the PRS source to the UE, corresponding to the second direction; and
determine whether the second distance is a line-of-sight distance between the UE and the PRS source based on the first direction, the first distance, the second direction, and the second distance,
wherein the processor is configured to:
obtain, from the ranging system (5) a plurality of first directions between the UE and a corresponding plurality of reflectors, and (6) a plurality of first distances corresponding to the plurality of first directions; and
determine whether the second distance is the line-of-sight distance between the UE and the PRS source without using any of the plurality of first direction indications based on the second direction being outside a threshold closeness with respect to each of the plurality of first directions.

8. A UE (user equipment) comprising:
means for transmitting a ranging signal and receiving a reflection of the ranging signal;
means for determining, based on the ranging signal and the reflection of the ranging signal, (1) a first direction, between the UE and a reflector, and (2) a first distance, between the UE and the reflector, corresponding to the first direction;
means for determining, based on a positioning reference signal (PRS) received by the UE from a PRS source, (3) a second direction, corresponding to an angle of arrival of the PRS at the UE, and (4) a second distance, traveled by the PRS from the PRS source to the UE, corresponding to the second direction; and
means for determining whether the second distance is a line-of-sight distance between the UE and the PRS source based on the first direction, the first distance, the second direction, and the second distance,
wherein the means for determining whether the second distance is the line-of-sight distance between the UE and the PRS source comprise means for determining that the second distance is the line-of-sight distance between the UE and the PRS source based on the first direction and the second direction being within a first threshold closeness and based on the first distance and the second distance being within a second threshold closeness.

9. The UE of claim 8, further comprising means for determining the first threshold based on an angular accuracy of the second direction.

10. The UE of claim 9, wherein the means for determining the first threshold comprise means for determining the first threshold based on a quantity of antenna elements of the means for determining the second direction between the UE and the PRS source.

11. A method of determining a line-of-sight relationship between a UE (user equipment) and a PRS source (positioning reference signal source), the method comprising:
transmitting a ranging signal;
receiving a reflection of the ranging signal;
determining, based on the ranging signal and the reflection of the ranging signal, (1) a first direction, between the UE and a reflector, and (2) a first distance, between the UE and the reflector, corresponding to the first direction;
determining, based on a PRS received by the UE from the PRS source, (3) a second direction, corresponding to an angle of arrival of the PRS at the UE, and (4) a second distance, traveled by the PRS from the PRS source to the UE, corresponding to the second direction; and
determining whether the second distance is a line-of-sight distance between the UE and the PRS source based on the first direction, the first distance, the second direction, and the second distance,
wherein determining whether the second distance is the line-of-sight distance between the UE and the PRS source comprises determining that the second distance is the line-of-sight distance between the UE and the PRS source based on the first direction and the second direction being within a first threshold closeness and based on the first distance and the second distance being within a second threshold closeness.

12. The method of claim 11, further comprising determining the first threshold based on an angular accuracy of the second direction.

13. The method of claim 12, wherein determining the first threshold comprises determining the first threshold based on a quantity of antenna elements used to determine the second direction between the UE and the PRS source.

14. The method of claim 11, further comprising sending a report comprising position information determined from the one or more PRS and at least one line-of-sight/non-line-of-sight indication indicating whether the position information is based on a line-of-sight measurement or a non-line-of-sight measurement.

15. The method of claim 14, wherein the position information comprises a location estimate of the UE.

16. A method of determining a line-of-sight relationship between a UE (user equipment) and a PRS source (positioning reference signal source), the method comprising:
    transmitting a ranging signal;
    receiving a reflection of the ranging signal;
    determining, based on the ranging signal and the reflection of the ranging signal, (1) a first direction, between the UE and a reflector, and (2) a first distance, between the UE and the reflector, corresponding to the first direction;
    determining, based on a PRS received by the UE from the PRS source, (3) a second direction, corresponding to an angle of arrival of the PRS at the UE, and (4) a second distance, traveled by the PRS from the PRS source to the UE, corresponding to the second direction; and
    determining whether the second distance is a line-of-sight distance between the UE and the PRS source based on the first direction, the first distance, the second direction, and the second distance,
    wherein determining whether the second distance is the line-of-sight distance between the UE and the PRS source comprises determining that the second distance is a non-line-of-sight distance between the UE and the PRS source based on the first direction and the second direction being within a first threshold closeness and based on the first distance and the second distance being outside of a second threshold closeness.

17. A non-transitory, processor-readable storage medium comprising processor-readable instructions to cause a processor of a UE (user equipment), in order to determine a line-of-sight relationship between the UE and a PRS source (positioning reference signal source), to:
    transmit a ranging signal;
    determine, based on the ranging signal and a reflection of the ranging signal received by the UE, (1) a first direction, between the UE and a reflector, and (2) a first distance, between the UE and the reflector, corresponding to the first direction;
    determine, based a PRS received by the UE from the PRS source, (3) a second direction, corresponding to an angle of arrival of the PRS at the UE, and (4) a second distance, traveled by the PRS from the PRS source to the UE, corresponding to the second direction; and
    determine whether the second distance is a line-of-sight distance between the UE and the PRS source based on the first direction, the first distance, the second direction, and the second distance,
    wherein the instructions to cause the processor to determine whether the second distance is the line-of-sight distance between the UE and the PRS source comprise instructions to cause the processor to determine that the second distance is the line-of-sight distance between the UE and the PRS source based on the first direction and the second direction being within a first threshold closeness and based on the first distance and the second distance being within a second threshold closeness.

* * * * *